United States Patent
Thubert et al.

(10) Patent No.: US 11,271,774 B2
(45) Date of Patent: Mar. 8, 2022

(54) REDUNDANT MULTICAST TREE IN A FAT TREE NETWORK TOPOLOGY WITH ANISOTROPIC ROUTING

(71) Applicant: Cisco Technology, Inc., San Jose, CA (US)

(72) Inventors: Pascal Thubert, Roquefort les Pins (FR); Patrick Wetterwald, Mouans Sartoux (FR); Eric Michel Levy-Abegnoli, Valbonne (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 93 days.

(21) Appl. No.: 16/747,157

(22) Filed: Jan. 20, 2020

(65) Prior Publication Data

US 2020/0259679 A1 Aug. 13, 2020

Related U.S. Application Data

(60) Provisional application No. 62/804,407, filed on Feb. 12, 2019.

(51) Int. Cl.
*H04L 12/44* (2006.01)
*H04L 12/18* (2006.01)
(Continued)

(52) U.S. Cl.
CPC ............. *H04L 12/44* (2013.01); *H04L 12/18* (2013.01); *H04L 12/184* (2013.01);
(Continued)

(58) Field of Classification Search
CPC ... H04L 12/44; H04L 12/184; H04L 12/2859; H04L 12/4633; H04L 12/6402;
(Continued)

(56) References Cited

U.S. PATENT DOCUMENTS 8,724,533 B2 5/2014 Thubert et al.
8,837,281 B2 9/2014 Sultan et al.
(Continued)

FOREIGN PATENT DOCUMENTS

CN 106330730 A 1/2017

OTHER PUBLICATIONS

The RIFT Authors, RIFT: Routing in FatTrees, Internet draft, draft-ietf-rift-rift-03, Oct. 19, 2018 (Year: 2018).*
(Continued)

*Primary Examiner* — Shailendra Kumar
(74) *Attorney, Agent, or Firm* — Leon R. Turkevich

(57) ABSTRACT

In one embodiment, a method comprises identifying a fat tree network topology comprising top-of-fabric (ToF) switching devices, an intermediate layer of intermediate switching devices connected to each of the ToF switching devices, and a layer of leaf network devices; and causing a first leaf network device to initiate establishment of first and second redundant multicast trees for multicasting of data packets, including: causing first and second ToF switching devices to operate as roots of the first and second multicast trees according to first and second attribute types, respectively, causing the first leaf network device to select first and second of the intermediate switching devices as first and second flooding relays belonging to the first and second attribute types, respectively, and causing the first and second flooding relays to limit propagation of registration messages generated by the first leaf network device to the first and second ToF switching devices, respectively.

20 Claims, 15 Drawing Sheets

(51) Int. Cl.

| | |
|---|---|
| *H04L 12/28* | (2006.01) |
| *H04L 12/46* | (2006.01) |
| *H04L 12/64* | (2006.01) |
| *H04L 12/751* | (2013.01) |
| *H04L 12/721* | (2013.01) |
| *H04L 29/06* | (2006.01) |
| *H04L 69/14* | (2022.01) |
| *H04L 45/02* | (2022.01) |
| *H04L 45/00* | (2022.01) |

(52) U.S. Cl.
CPC ...... *H04L 12/2859* (2013.01); *H04L 12/4633* (2013.01); *H04L 12/4641* (2013.01); *H04L 12/6402* (2013.01); *H04L 45/02* (2013.01); *H04L 45/32* (2013.01); *H04L 69/14* (2013.01)

(58) Field of Classification Search
CPC ..... H04L 45/02; H04L 45/32; H04L 12/4641; H04L 69/14; H04L 12/18; H04L 49/1515; H04L 45/48; H04L 49/1569; H04L 45/16; H04L 12/1877; H04L 12/1886
See application file for complete search history.

(56) References Cited

U.S. PATENT DOCUMENTS

| | | | | |
|---|---|---|---|---|
| 8,989,049 | B2 | 3/2015 | Yang et al. | |
| 9,210,071 | B2 | 12/2015 | Allan et al. | |
| 9,369,376 | B2 | 6/2016 | Yuan et al. | |
| 9,419,811 | B2 | 8/2016 | Dong et al. | |
| 10,389,173 | B2 | 8/2019 | Seewald et al. | |
| 2004/0081152 | A1* | 4/2004 | Thubert | H04L 45/04 370/392 |
| 2017/0302464 | A1* | 10/2017 | Hu | H04L 12/185 |
| 2019/0379582 | A1* | 12/2019 | Johnsen | H04L 45/245 |
| 2021/0127320 | A1* | 4/2021 | Choo | H04L 61/305 |

OTHER PUBLICATIONS

The RIFT Authors, "RIFT: Routing in Fat Trees", RIFT Working Group, Internet Draft, Oct. 19, 2018, [online], [retrieved on Sep. 12, 2019]. Retrieved from the Internet: URL: <https://tools.ietf.org/pdf/draft-ietf-rift-rift-03.pdf>, pp. 1-113.

Li, Ed., et al., "Dynamic Flooding on Dense Graphs", Internet Engineering Task Force, Internet Draft, Dec. 3, 2018, [online], [retrieved on Sep. 12, 2019]. Retrieved from the Internet: URL: <https://tools.ietf.org/pdf/draft-li-lsr-dynamic-flooding-02.pdf>, pp. 1-37.

Kummer et al., "Building Multicast Trees in Ad-hoc Networks", Jan. 2008, [online], [retrieved on Aug. 16, 2019]. Retrieved from the Internet: URL: <http://citeseerx.ist.psu.edu/viewdoc/download?doi=10.1.1.586.8030&rep=rep1&type=pdf>, pp. 1-8.

Handley et al., "Bidirectional Protocol Independent Multicast (BIDIR-PIM)", Network Working Group, Request for Comments: 5015, Oct. 2007, pp. 1-43.

Fenner et al., "Protocol Independent Multicast—Sparse Mode (PIM-SM): Protocol Specification (Revised)", Internet Engineering Task Force (IETF), Request for Comments: 7761, Mar. 2016, pp. 1-137.

Atlas et al., "An Architecture for IP/LDP Fast Reroute Using Maximally Redundant Trees (MRT-FRR)", Internet Engineering Task Force (IETF), Request for Comments: 7812, Jun. 2016, pp. 1-44.

The RIFT Authors, "RIFT: Routing in Fat Trees", RIFT Working Group, Internet Draft, Jun. 23, 2019, [online], [retrieved on Aug. 16, 2019]. Retrieved from the Internet: URL: <https://www.ietf.org/archive/id/draft-ietf-rift-rift-06.txt>, pp. 1-114.

Wikipedia, "Protocol Independent Multicast", Dec. 27, 2017, [online], [retrieved on Sep. 16, 2019], Retrieved from the Internet: URL: <https://en.wikipedia.org/w/index.php?title=Protocol_Independent_Multicast&printable=yes>, pp. 1-5.

Thubert et al., U.S. Appl. No. 16/585,839, filed Sep. 27, 2019.

* cited by examiner

REDUNDANT MULTICAST TREE IN A FAT TREE NETWORK TOPOLOGY WITH ANISOTROPIC ROUTING

This application claims priority to Provisional Application No. 62/804,407, filed Feb. 12, 2019.

TECHNICAL FIELD

The present disclosure generally relates to a redundant multicast tree in a fat tree network topology.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Modern electrical substations are using IEC standard 61850 for data modeling and interconnection of Intelligent Electrical Devices (IEDs) that perform huge computations to manage the generation, transport and distribution of the energy.

An issue in such systems is how to support multicast and broadcast. Two redundant trees can be built for reliable multicast. One way of building those trees may be to leverage MRT (maximally redundant tree) according to the Internet Engineering Task Force (IETF) Request for Comments (RFC) 7812. MRT-FRR creates two alternate forwarding trees that are distinct from the primary next-hop forwarding used during stable operation. These two trees are maximally diverse from each other, providing link and node protection for 100% of paths and failures as long as the failure does not cut the network into multiple pieces.

However, the problem remains that the design and installation of a source tree for every possible multicast group from every possible source is not scalable; further, installation of a source tree for a multicast group may be suboptimal for leaf network devices in a fat tree topology that may be multicast listeners, or for a leaf network device operating as a multicast source for an identified multicast data flow.

Hence, there is a need for an optimization resembling a VxLAN ingress endpoint and yet can leverage an underlay multicast in a network utilizing a fat tree topology.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
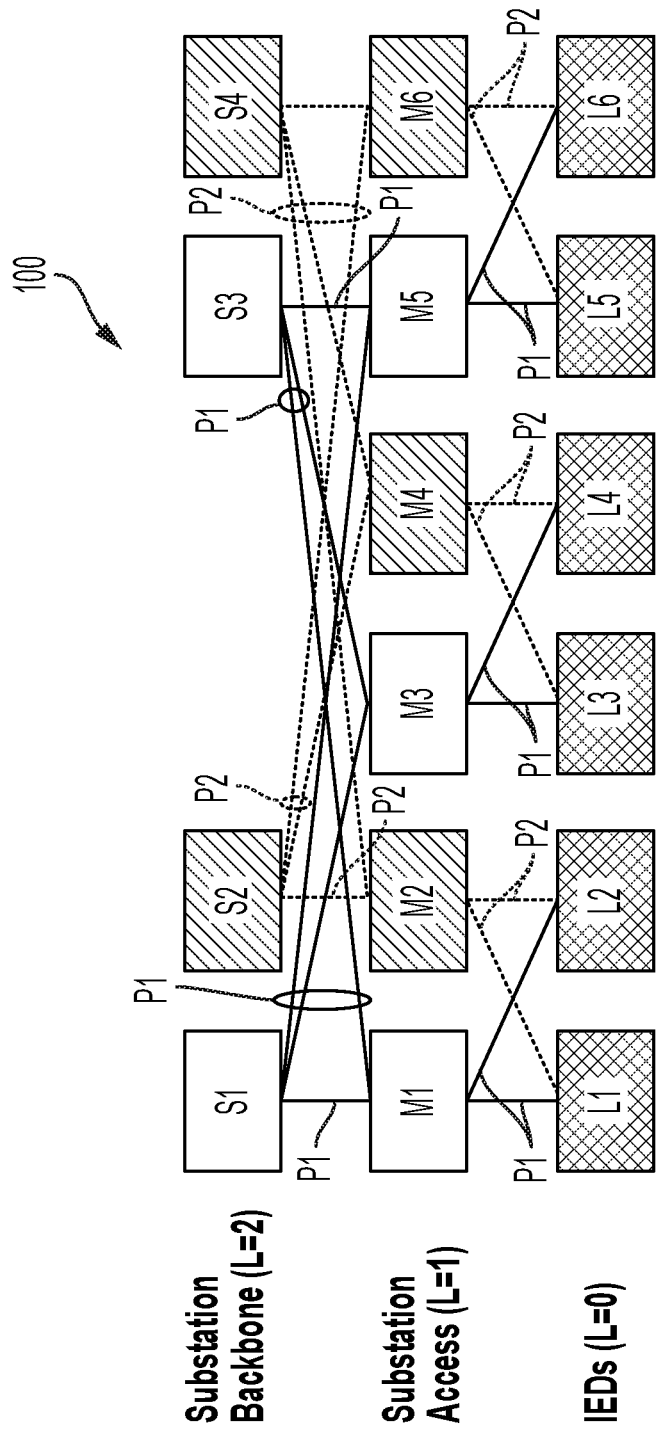
FIG. 1 illustrates a multiplane fat tree topology with redundant planes, according to an example embodiment.

In one embodiment, a method comprises: identifying, by an apparatus, a fat tree network topology comprising a top-of-fabric (ToF) layer of ToF switching devices, an intermediate layer of intermediate switching devices connected to each of the ToF switching devices, and a layer of leaf network devices; and causing, by the apparatus, a first of the leaf network devices to initiate establishment of first and second redundant multicast trees for multicasting of data packets. The causing of the first leaf network device to initiate establishment of the first and second redundant multicast trees includes: causing a first of the ToF switching devices to operate as a corresponding root of the first multicast tree, and a second of the ToF switching devices to operate as the corresponding root of the second multicast tree, the first multicast tree allocated a first attribute type and the second multicast tree allocated a second distinct attribute type; causing the first leaf network device to select first and second of the intermediate switching devices as respective first and second flooding relays, including causing the first leaf network device to generate and flood one or more registration messages identifying the first flooding relay as belonging to the first attribute type and the second flooding relay as belonging to the second distinct attribute type; and causing the first and second flooding relays to limit propagation of the one or more registration messages to the first and second ToF switching devices, respectively.

In another embodiment, an apparatus is implemented as a physical machine, the apparatus comprising: non-transitory machine readable media configured for storing executable machine readable code; a device interface circuit configured for communications in a data network; and a processor circuit. The processor circuit is configured for executing the machine readable code, and when executing the machine readable code operable for: identifying a fat tree network topology comprising a top-of-fabric (ToF) layer of ToF switching devices, an intermediate layer of intermediate switching devices connected to each of the ToF switching devices, and a layer of leaf network devices; and causing a first of the leaf network devices to initiate establishment of first and second redundant multicast trees for multicasting of data packets. The causing of the first leaf network device to initiate establishment of the first and second redundant multicast trees includes: causing a first of the ToF switching devices to operate as a corresponding root of the first multicast tree, and a second of the ToF switching devices to operate as the corresponding root of the second multicast tree, the first multicast tree allocated a first attribute type and the second multicast tree allocated a second distinct attribute type; causing the first leaf network device to select first and second of the intermediate switching devices as respective first and second flooding relays, including causing the first leaf network device to generate and flood one or more registration messages identifying the first flooding relay as belonging to the first attribute type and the second flooding relay as belonging to the second distinct attribute type; and causing the first and second flooding relays to limit propagation of the one or more registration messages to the first and second ToF switching devices, respectively.

In another embodiment, one or more non-transitory tangible media encoded with logic for execution by a machine and when executed by the machine operable for: identifying a fat tree network topology comprising a top-of-fabric (ToF) layer of ToF switching devices, an intermediate layer of intermediate switching devices connected to each of the ToF switching devices, and a layer of leaf network devices; and causing a first of the leaf network devices to initiate establishment of first and second redundant multicast trees for multicasting of data packets. The causing of the first leaf network device to initiate establishment of the first and second redundant multicast trees includes: causing a first of the ToF switching devices to operate as a corresponding root of the first multicast tree, and a second of the ToF switching devices to operate as the corresponding root of the second multicast tree, the first multicast tree allocated a first attribute type and the second multicast tree allocated a second distinct attribute type; causing the first leaf network device to select first and second of the intermediate switching devices as respective first and second flooding relays, including causing the first leaf network device to generate and flood one or more registration messages identifying the first flooding relay as belonging to the first attribute type and the second flooding relay as belonging to the second distinct attribute type; and causing the first and second flooding relays to limit propagation of the one or more registration messages to the first and second ToF switching devices, respectively.

DETAILED DESCRIPTION

Particular embodiments enable one or more leaf network devices in a fat tree network topology to initiate establishment of one or more redundant multicast trees based on utilizing anisotropic routing, where distribution of registration messages specifying routing information and/or multicast advertisement information can be constrained or limited ("summarized") along a limited portion of the fat tree network topology (e.g., along a "North-South" gradient). The establishment of the one or more redundant multicast trees can be independent and distinct from any multicast group, such that the redundant multicast trees are established separate and distinct from any multicast group; hence, the redundant multicast trees can be built proactively in the fat tree network topology, enabling dynamic allocation of a multicast group to an established multicast tree.

The establishment of the redundant multicast trees can be initiated by leaf network devices in the fat tree network topology, where the fat tree network topology comprises a top-of-fabric (ToF) layer of ToF switching devices, an intermediate layer of intermediate switching devices connected to each of the ToF switching devices, and a layer of leaf network devices. Each leaf network device is connected to two or more intermediate switching devices operable as parent devices for the leaf network device.

A leaf network device can select a first of multiple parent devices as a (first) "forwarding relay" for a first multicast tree in the fat tree network topology, and the leaf network device can select other parent devices as "null" devices that are excluded from the first multicast tree; the leaf network device also can select a second (distinct) of the multiple parent devices as a second forwarding relay for a second multicast tree distinct from the first multicast tree, where the leaf network device can allocate distinct binary attribute types (e.g., "genders") to each of the first and second forwarding relays (e.g., the first forwarding relay designated "male" or "black" type and the second forwarding relay designated "female" or "red" type).

The leaf network device can generate and flood registration messages (e.g., tree establishment messages). The tree establishment messages can specify at least routing information for identifying the first (and/or second) forwarding relay(s), enabling the parent network devices in the fat tree topology to determine membership in the first or second multicast trees (designated, e.g., male/female, etc.). Hence, a parent network device in the fat tree topology can determine from a received tree establishment message whether it was chosen by a leaf network device as a first (e.g., "male"/"black") forwarding relay for a first (e.g., "male"/"black") tree topology, a second (e.g., a "female"/"red") forwarding relay for a second (e.g., a "female"/"red") tree topology, or a "null" device that disables forwarding of any data packets in the identified tree topology.

The "member" forwarding relays can forward the registration messages (e.g., tree establishment messages) to one or more identified root network devices within a Top-of-Fabric (ToF) layer of the fat tree topology, whereas the "null" forwarding relays do not forward any data packets to the one or more root network devices. Hence, the first and second flooding relays can limit propagation of the registration messages (e.g., tree establishment messages) to the first and second ToF switching devices that are identified as the roots of the first and second multicast trees, respectively, as opposed to unrestricted flooding by all the intermediate switching devices to all the ToF switching devices.

The leaf network device also can include, within the registration messages, multicast listener information for registering the leaf network device as a multicast listener for an identified multicast flow of data packets; hence, the leaf network device can initiate establishment of the redundant first and second multicast trees for an identified multicast flow of data packets, where the first and second flooding relays can flood the multicast listener information (identifying the identified multicast flow of data packets) to other leaf network devices, enabling other leaf network devices to respond as multicast listeners for the identified multicast flow.

The leaf network device also can generate and unicast transmit, to the ToF switching devices via the respective first and second flooding relays, a multicast listener advertisement message for an identified multicast flow of data packets, where the multicast listener advertisement message is distinct from the tree establishment message. Hence, the leaf network device can establish the first and second redundant multicast trees (or even additional redundant multicast trees) based on the tree establishment messages, and later allocate one or more of the established multicast trees for the identified multicast flow of data packets based on generating and outputting the multicast listener advertisement message (specifying the associated allocated attribute type) to the selected flooding relay associated with the allocated one or more multicast trees.

Hence, the example embodiments enable scalable establishment of one or more multicast trees by leaf network devices in the fat tree network topology based on leaf-selected forwarding relays that can constrain flooding of the tree establishment messages to at least one identified root network device (for a single tree), or two root network devices (e.g., for binary "male" and "female" trees). The example embodiments also can limit multicast traffic based on a separate and distinct registration of a multicast listener for an identified multicast flow along an identified tree topology, in order to minimize traffic in the fat tree topology for an identified multicast flow providing large amounts of data traffic for relatively few multicast listeners (also referred to as "elephant flows" or "heavy flows" that requires substantial network bandwidth).

The example embodiments will be described with reference to establishing redundant multicast trees within a fat tree network topology, including establishing redundant multicast trees according to a RIFT protocol.

FIG. 1 illustrates a fat tree network topology (100 in the Figures) of physical network devices (e.g. in an Internet Protocol (IP) based network 100). Particular embodiments enable establishment of a multiplane fat tree (102 of FIG. 2) in the fat tree network topology 100 that can implement a substation network with redundant planes P1, P2 of multicast trees (e.g., "Black-T1" 104a and "Red-T2" 104b). Network devices are illustrated in the Figures as rectangles. The multiplane fat tree 102 established along the multiple planes P1, P2 within a fat tree topology 100 can establish an underlay fabric that can forward multicast packets via the redundant multicast trees 104 and 104b. The example embodiments can establish an overlay (e.g., an overlay of VxLAN tunnels 106 in FIG. 11) network and underlay (e.g., a tree technology) networks over a distributed cloud organized as Fat Tree underlays interconnected at Layer-3.

The particular embodiments can establish the multiplane fat tree 102 based on establishing that each node allocated as a relay node (i.e., forwarding device) in one multicast tree (e.g., multicast tree "T1" 104a) is allocated as a leaf node in the second multicast tree (e.g., multicast tree "T2" 104b). Hence, the redundancy at each level of a fat tree guarantees that the two multicast trees 104 do not share any common data link, such that each network device is guaranteed to receive a multicast packet via at least one of the multicast trees 104 despite any breakage of a data link in the fat tree network topology 100. Moreover, the redundant trees 104 can be deployed in a scalable manner in a large-scale fat tree network topology.

Modern International Electrotechnical Commission (IEC) standard 61850 based substations are using IEC standard 61850 for data modeling and interconnection of IEDs. IED stands for Intelligent Electrical Device and performs huge computations to manage the generation, transport and distribution of the energy. Generic Object Oriented Substation Event (GOOSE) and Sample Values (SV) traffic are multicast traffic with strong communication reliability requirements which means that redundancy mechanisms should be used. MMS is IP unicast and mainly used for command and control messages. Recent evolution in the deployment of IEC 61850 makes communication between substations a new requirement. Goose and Sample Values are communicated between IEC 61850 substations using Process bus and Station bus is based on to traffic separation.

The amount of traffic between IEDs could be huge and IEC 61850 recommends separating it between multicast domains. IEC 61850 substation communications are described in an "SCD" file. Using this file, a network administrator can "engineer" a communication network and define VLANs; however, reliance on a network administrator to engineer such a network using an SCD file can be relatively difficult and complex task to achieve and may take up to a month for a very large substation. The SV/Goose items are the number of multicast flows: one SV flow represents approximately a traffic of 6 Mbit/s.

Another important aspect is the communication reliability requirements. The 61850-90-4 technical report describes communication architecture based on Packet Redundancy Protocol (PRP) and High-Availability Seamless Redundancy (HSR) mechanisms. These are duplication and elimination mechanisms on two redundant networks.

Figure 2:
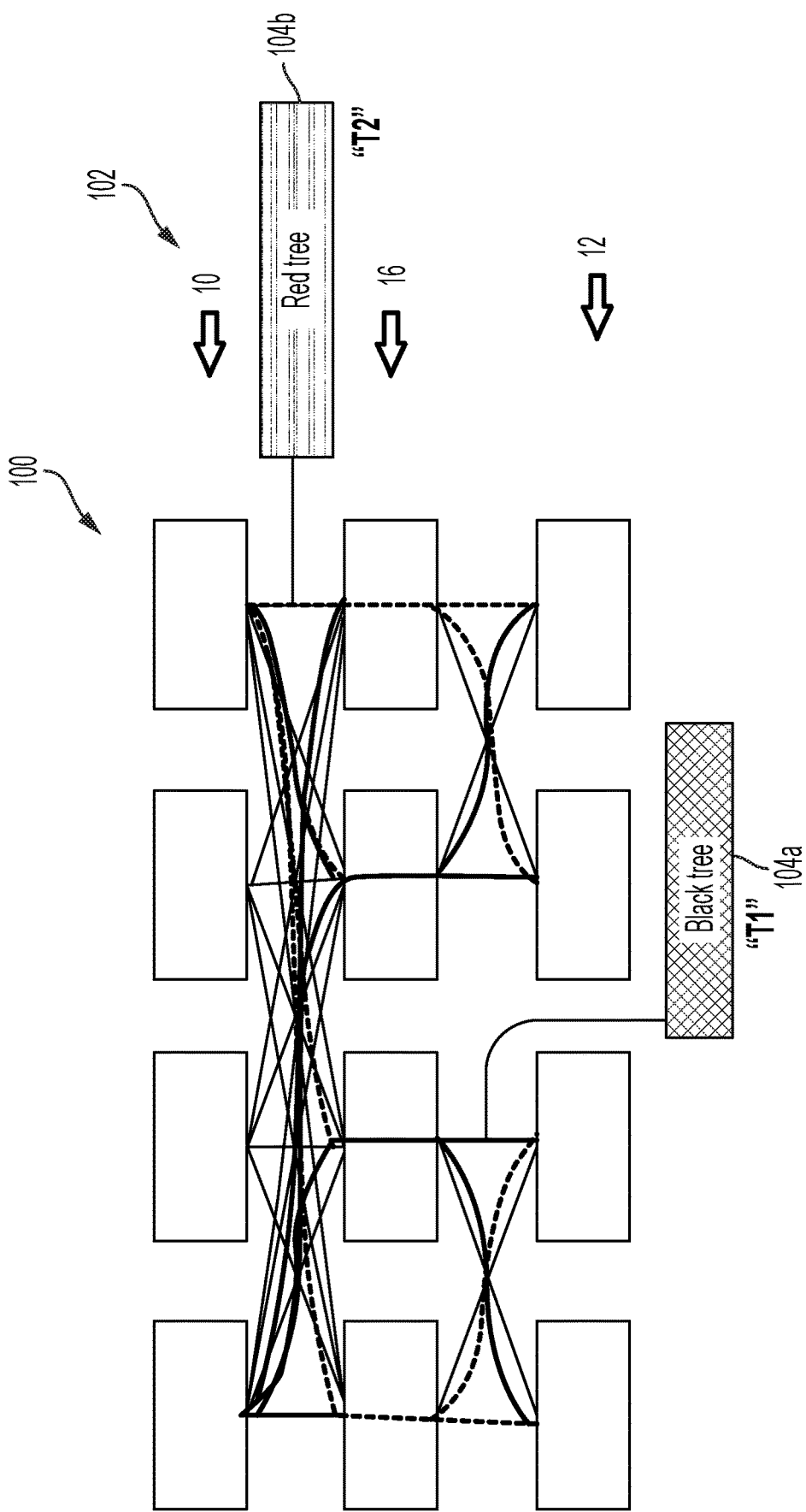
FIG. 2 illustrates creation of redundant multicast trees in a fat tree topology that covers all the leaf network devices, a spine and/or super spine, according to an example embodiment.
Figure 3:
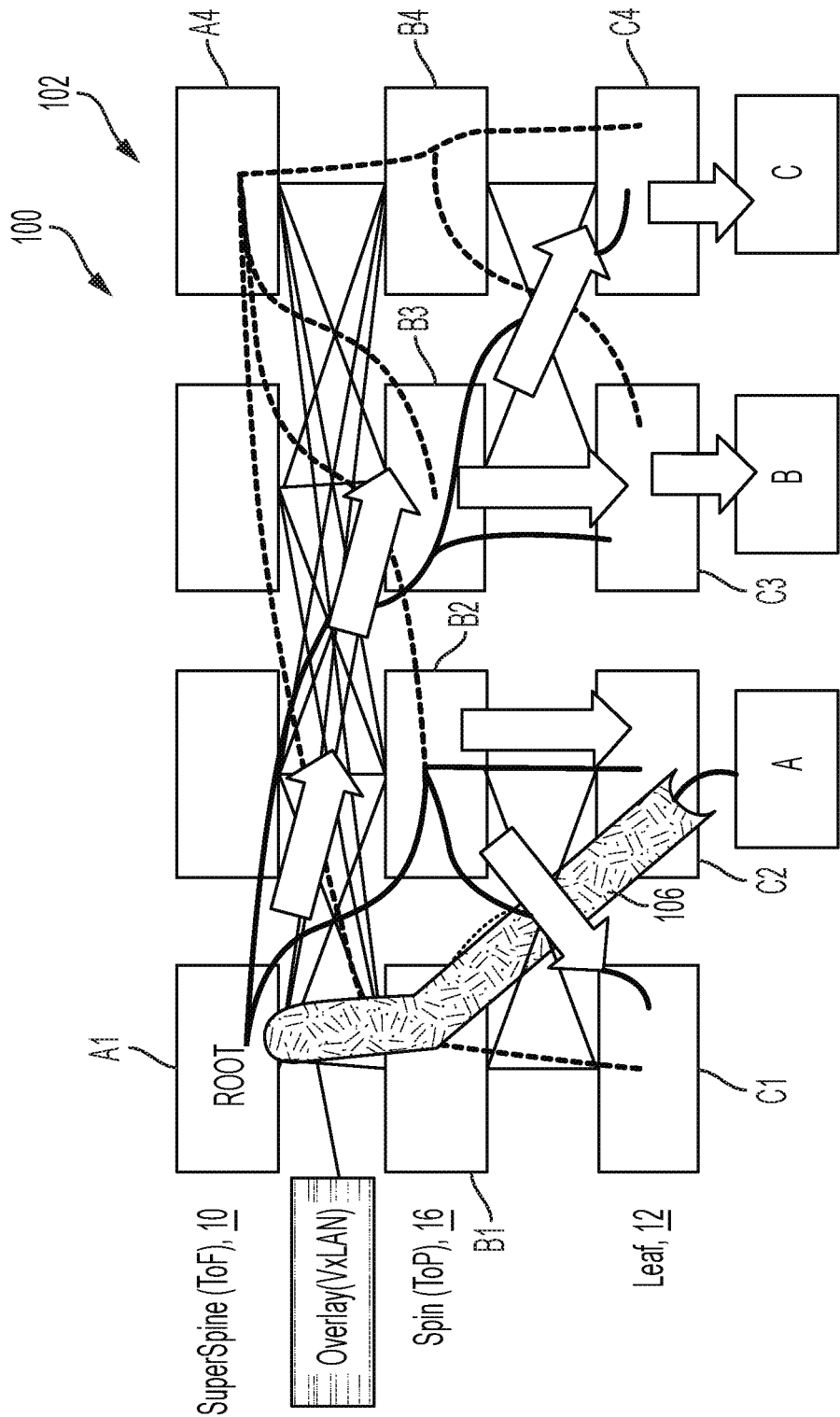
FIG. 3 illustrates creation of redundant multicast trees in a fat tree topology according to a proposal to a RIFT routing protocol, according to another example embodiment.
Figure 4:
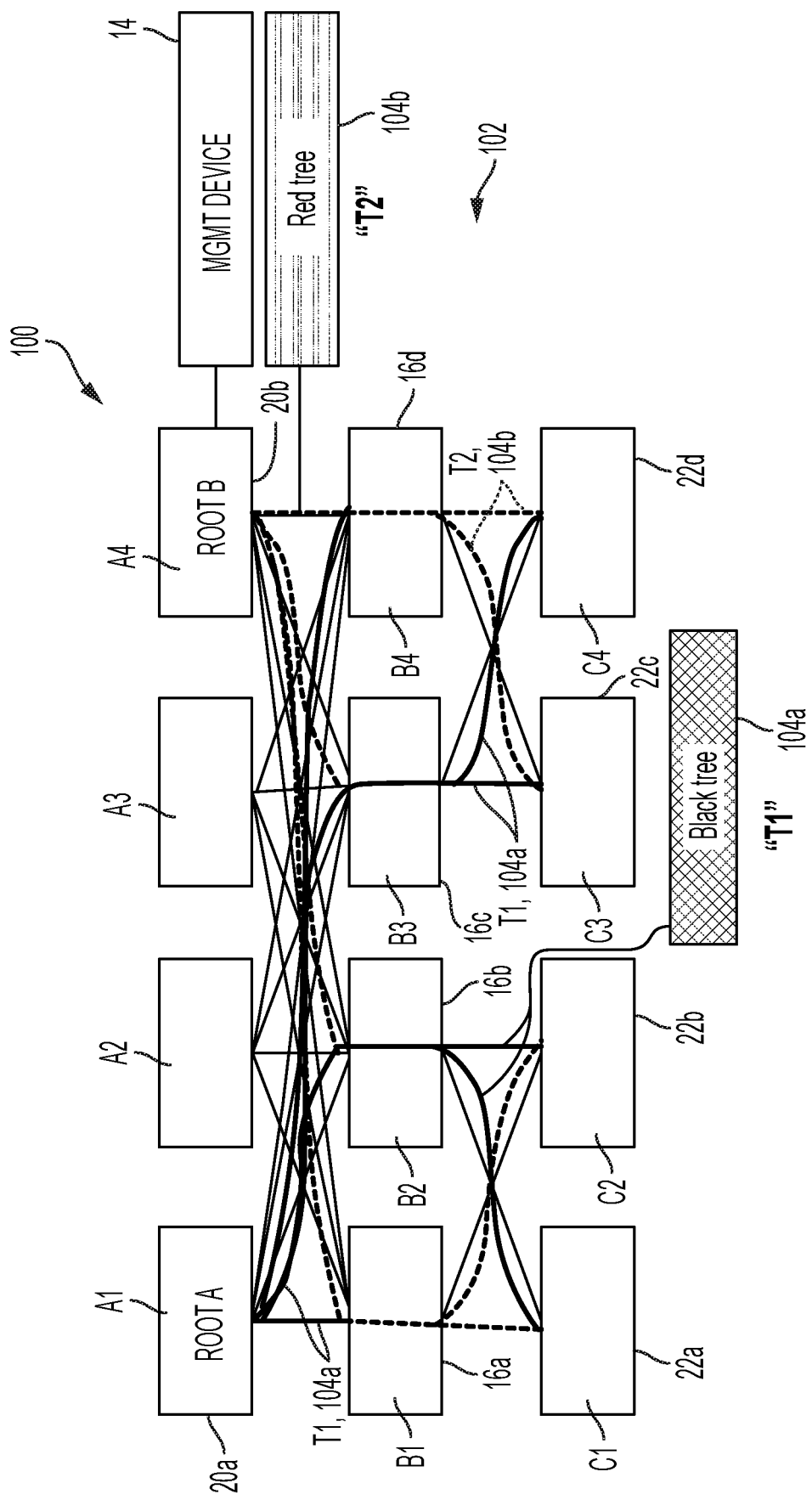
FIG. 4 illustrates an example embodiment that builds and selects redundant trees for the distribution of a multicast flow, according to an example embodiment.
Figure 5:
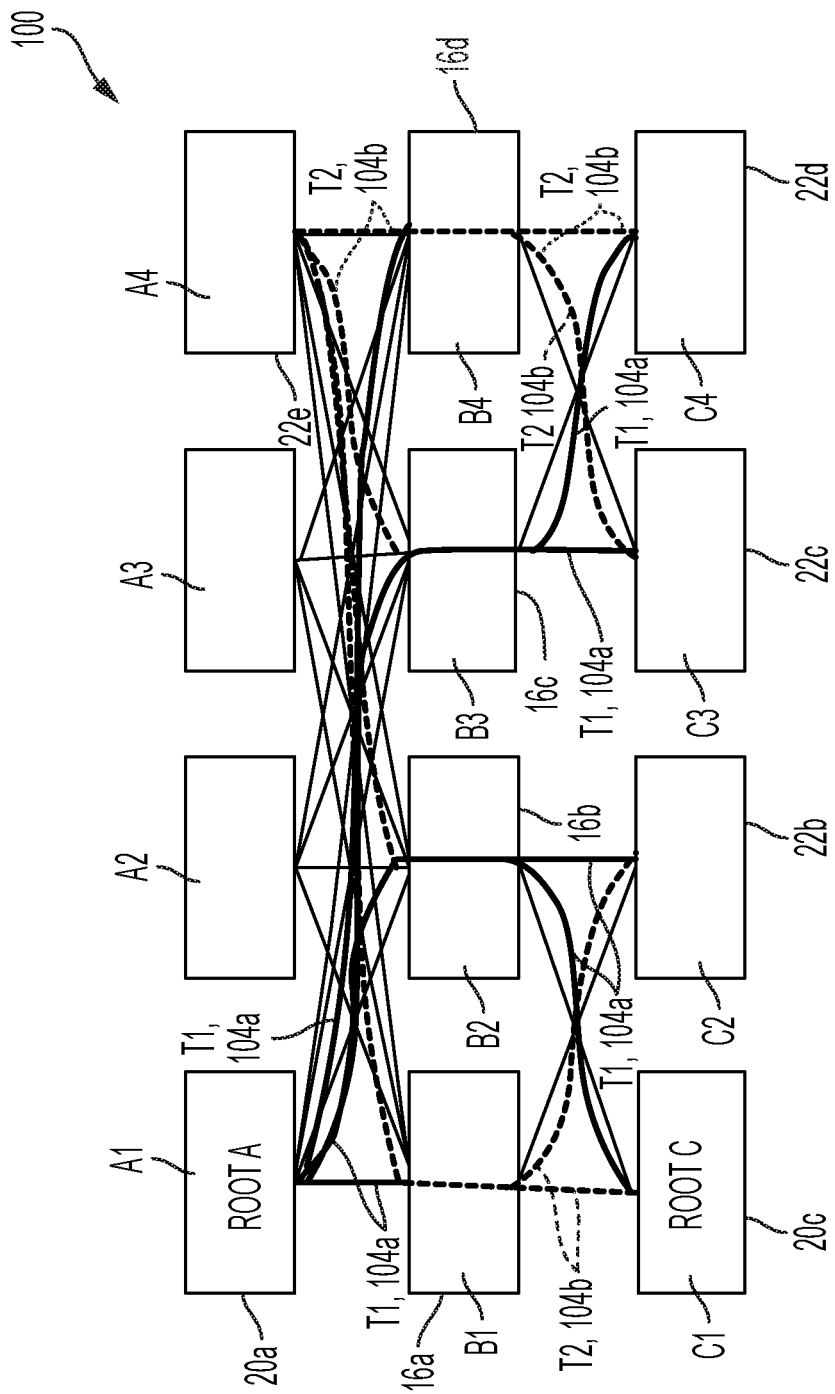
FIG. 5 illustrates a selecting a pair of trees to be used in the fabric for a particular multicast flow, according to an example embodiment.
Figure 6:
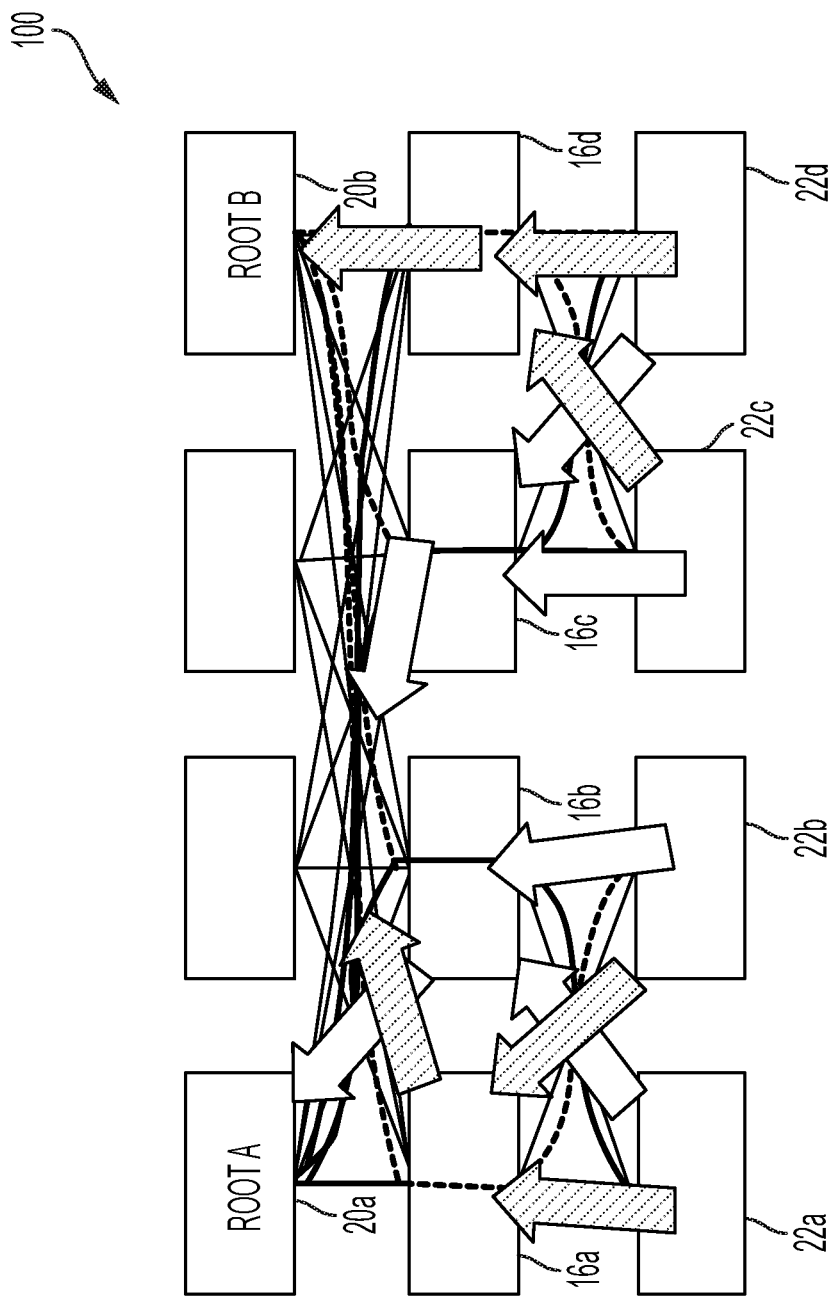
FIG. 6 illustrates flooding membership advertisements northwards toward roots of multicast trees, according to an example embodiment.

Hence, the example embodiments can cause creation of redundant multicast trees 104a, 104b in a fat tree network topology 100 that covers all the leaves (12 in FIGS. 2-3; 22 in FIGS. 4-6 and spine and super spine. A "Fat Tree" topology refers to a topology comprising multiple (e.g., one hundred or more) top-of-fabric (ToF) devices 10 and a substantially limited depth or "hops" between any ToF device 10 and any terminal leaf device 12; in other words, a "substantially limited depth" generally is limited to no more than a few hops (e.g., 2-4 hops) of intermediate network devices (also referred to as Top-of-Pod (ToP) devices) 16 between the ToF device 10 and a terminal device 12. The multicast trees 104a and 104b (e.g., the "black" and "red" tree) can be built downwards, in such a fashion that a Spine Node 16 is a relay node for one tree then it is an end node for the other.

FIG. 3 illustrates building the multiplane fat tree 102 in the fat tree network topology 100 based on a proposal to the RIFT routing protocol ("Routing in Fat Trees") (hereinafter the "RIFT proposal"), the RIFT routing protocol described in one example by the Internet Engineering Task Force (IETF) "RIFT" Working Group in the Internet Draft entitled "RIFT: Routing in Fat Trees" (draft-ietf-rift-rift-03). FIG. 3 illustrates that the multiplane fat tree 102 illustrated in FIG. 2 can distribute multicast flows injected at the lower level, which can be a generic leaf device, or an IED in a substation. In a generic network topology, the Root (rendezvous point) can be selected anywhere in the tree. In the RIFT proposal and in smartgrid stations, the roots can be chosen at the Superspine layer 10, and the trees can be oriented to flood downwards toward the leaf network devices 12. Multicast addresses can be injected like any routing prefix so as to use any tree (also referred to as "tree topology"), but the multicast flooding is controlled within the tree.

Multicast listener advertisements can be source-independent and flooded together with unicast destination advertisements; the difference is indicated by the type of address. For reference, multicast addresses can be in the range 224.0.0.0 through 239.255.255.255 for IPv4 and identified by the binary 11111111 at the start of the address with IPv6.

Source announcements can be signaled by mapping (S,G) in to new multicast prefix (*,G') and advertising it from the root ("S" refers to a source of multicast packets and "G"

refers to the group "G", and "(*,G)" refers to all traffic to the group "G" regardless of the source). The mapped source announcements prefix (*,G') can be sent to the interested end points using the (*,G) tree that is built; hence, "G'" can be used to map to "(S, G')" such that "(S, G')" can be advertised in a unicast protocol. The "(*.*)" tree could also be used, if desired. The interested receivers can selectively join the (*,G') tree and receive the specific source stream (S,G).

As described in further detail below with respect to FIGS. 10A and 10B, multicast traffic injected in the fabric 100 can converge to the root ToF node 10 and be redistributed down along a tree rooted at the ToF node 10.

The tree can be established for that ToF Node and independent of the (S, G). A simple tree can be derived from the forwarding relays (FR) 16 by forming trees along the FR graph rooted at the Top-of-Pod (ToP) nodes 16, and joining them with a super-root at the ToF devices 10. To achieve this, a terminal device 12 inside the fabric 100 can select as preferred parent the first FR 16 in its list as a feasible multicast parent. This is the parent with the most redundancy among the multicast capable ones. This election is indicated with the FR indication.

As described in further detail below with respect to FIGS. 10A and 10B, a ToF device 10 can forward the multicast packets south to all connected ToP nodes. The packets can be then flooded down the preferred parent tree all the way to the leaves.

Any ToF node 10 that can reach all the leaves 12 can act as super-root of its own tree 104 and advertise (*,*). The result is a collection of super-trees that have different super-roots but share the same structure from the ToP down along the preferred parent trees.

A node (e.g., "C2" 12 in the Figures) inside the fabric 100 can use all of its feasible multicast parents for the northbound ECMP load balancing of northbound multicast packets, regardless of whether they are preferred parents or not.

Instead of limiting the forwarding south for multicast packets to the preferred parent tree, a parent in the fabric 100 can forward a multicast packet down to all the children that elected this parent as FR.

In one optional behavior, if there are few listeners and elephant flows, the listeners can be advertised using normal Topology Information Element (TIE) flooding. In that case, a packet is forwarded south only if that southern node advertised a listener in its Northbound TIEs (N-TIEs).

Alternatively, mice flows (i.e., "light flows") that have many listeners do not need to be injected in the routing. Those mice flows can be delivered to all leaves (the leaves can filter based on their attached listeners). In this example of FIG. 3, the RIFT proposal can use the Flooding Relay (FR) selection and can attribute a "gender" (e.g., a tag or a "type") to two (2) of the Flooding Relays (FRs). It results that every node belongs to a "male" type and a "female" type tree, which are link disjoint, and may be node disjoint as well if the nodes (i.e., network devices) are attributed a gender.

Various options are available in FIG. 3: all network nodes (i.e., network devices) in FIG. 3 but the leaves can be given a gender or "color" during the zero touch provisioning (ZTP) phase; only Superspine (ToF) 10 nodes can be allocated a gender as part of the initial configuration (if there are planes then they are taken in different planes), e.g., only two of the ToF nodes are given a gender, or all of the Superspine (ToF) nodes are given a gender.

Multicast in FIG. 3 can use the FRs for the multicast operation as follows: if one of the parents do not have a gender, the child can assign a gender and indicate the gender in the same message used to signal the role as FR. In that case the gender is per link and the trees are link-disjoint but not node-disjoint. If the parents have a gender, then the gender becomes a constraint in the FR selection algorithm, the child must select a male and a female parent among its FRs. In any fashion, the result is that there is a northbound link that is male and a northbound link that is female.

Recursively a same-gender path is established from each leaf to an ancestor ToF node of that gender, though the leaf is totally unaware of who that ancestor is. In the case where there is only one ToF Node with a gender, all the multicast traffic flows through that node and then south in the global same-gender tree. Conversely, there is a male (and respectively a female tree) spanning all the reachable leaves from every male (and respectively female) ToF nodes, respectively. The trees are link-disjoint. If all nodes have a gender, then the trees are also node disjoint.

As described below, a source can output copies of each multicast packets, tagged with a gender (male and female) or "color" ("black" or "red"), for flooding along the appropriate multicast tree 104 according to the gender or color. Multicast packets can be sent North to the same gender ToF Node, and then the ToF node sends it down the same gender tree; alternately, there can be multiple ToF nodes rooting a partial gender tree, and a multicast packet going north can be given to all of them by the ToP node for total distribution down the respective gender trees.

In an alternate variation of FIG. 3, a tunnel 106 such as a VxLAN encapsulation can be used for Northbound traffic (i.e., away from the leaf and toward a root). In that case the exact location of the root and whether there is only one root or multiple ones can be abstracted by the VxLAN itself, as illustrated in FIG. 3.

As described previously, two redundant trees can be built for reliable multicast: those two trees should have minimal reliance on common nodes (redundant, disjoint trees). One way of building those trees may be to leverage MRT per RFC 7812. MRT-FRR creates two alternate forwarding trees that are distinct from the primary next-hop forwarding used during stable operation. These two trees are maximally diverse from each other, providing link and node protection for 100% of paths and failures as long as the failure does not cut the network into multiple pieces.

Unlike the past problems of flooding in a complete bipartite graph such as a Clos or a fat trees topology, the example embodiments provide a specific method that applies in complete bipartite graphs. The example embodiments provide an efficient and simple technique whereby a node in one of the trees is a leaf on the other. Hence, a breakage cannot block transmission down both trees since the breakage hits a leaf of one of the trees. The example embodiments need not span the entire graph since the distribution of multicast data is typically only for the leaves, as opposed to the flooding of LSR such as discussed in Li et al.

FIG. 4 illustrates an example of one or more management devices 14 that builds and selects redundant trees having respective different roots 20 for the distribution of a multicast flow (e.g., a "black" tree 104a comprising a root network device 20a and a "red" tree 104b comprising a root network device 20b) in a Fat Tree topology 100. In particular, the network devices can be arranged by a processor circuit 42 (FIG. 8) of the management device (i.e., controller device) 14 in operation 50 of FIG. 9A into a fat tree network topology 100 comprising a ToF device layer 10, a ToP device layer 16, and a terminal device layer 22.

The processor circuit 42 of the management device (also referred to herein as "manager" or "mgr.") 14 (optionally executing a map server/map resolver (MSMR)) can establish a terminal device (12 of FIG. 3; 22 of FIG. 4) based on establishing the redundant multicast trees 104a and 104b in operation 52. In particular, the terminal device 12/22 in operation 52 can allocate a pair of trees 104a, 104b to be used in the fabric 100 for a particular multicast flow. The example of FIG. 4 is optimized for the Clos/Fat tree fabric design, and takes advantage of that particular design to provide reliable multicast in a cheap and efficient fashion.

The trees can cover all the leaves and spine and super spine, in a manner that an intermediate node (i.e., "top-of-pod" (ToP) device) 16 is a forwarder in one tree then it is a leaf 22 in the other. As illustrated in FIG. 4, the processor circuit 42 of the management device 14 in operation 54 can designate (i.e., allocate) the ToF device "A1" 10 as a root network device 20a for the multicast tree "T1" 104a; the management device 14 in operation 54 also can designate (i.e., allocate) the ToF device "A4" 10 as a root network device 20b for the multicast tree "T2" 104b for a given multicast group (e.g., "(*,G)").

The processor circuit 42 of the management device 14 in operation 56 can designate (i.e., allocate) the intermediate nodes "B2" 16b and "B3" 16c as first forwarding network devices in the "black" multicast tree "T1" 104a rooted by the root network device "A1" 20a; the processor circuit 42 of the management device 14 in operation 56 also can allocate the intermediate nodes "B1" 16a and "B4" 16d as first leaf devices in the "black" multicast tree "T1" 104a rooted by the root network device 20a.

The processor circuit 42 of the management device 14 in operation 58 can allocate the intermediate devices "B1" 16a and "B4" 16d as second forwarding network devices in the "red" multicast tree "T2" 104b rooted by the root network device "A4" 20b. The processor circuit 42 of the management device 14 in operation 58 also can allocate the intermediate nodes "B2" 16b and "B3" 16c as second leaf nodes in the "red" multicast tree "T2" 104b rooted by the root network device 20b. The management device 14 can allocate the terminal devices "C1" through "C4" as terminal devices, accordingly.

Figure 9A:
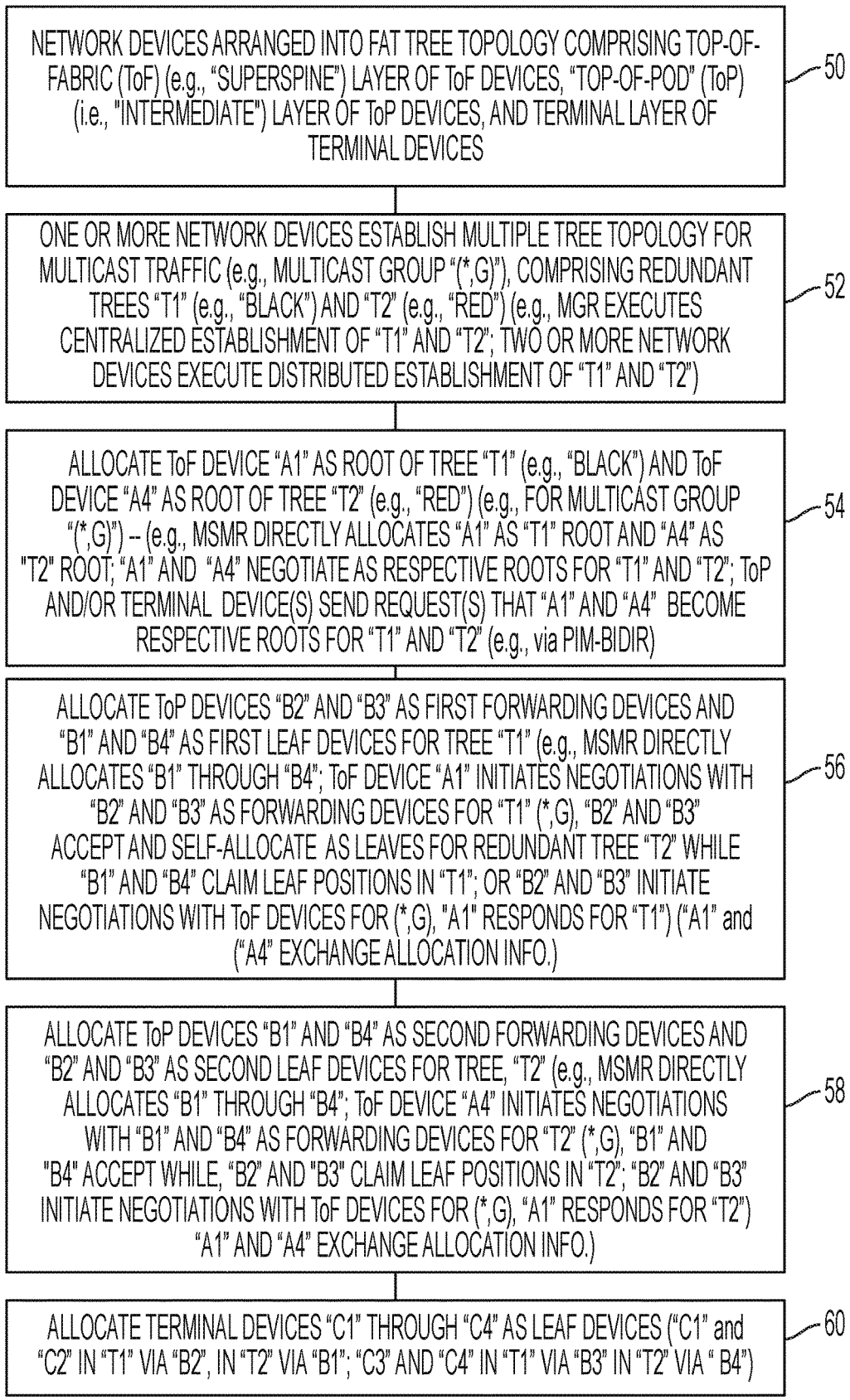
FIGS. 9A-9C illustrate an example method of deploying the redundant multicast trees in a fat tree topology for one or more multicast groups, according to an example embodiment.

Hence, the management device 14 in operations 50 through 60 in FIG. 9A can generate the "black" multicast tree 104a of FIG. 4 comprising the root network device "A1" 20a, the intermediate devices "B2" 16b and "B3" 16c as first forwarding network devices, and first leaf nodes "B1" 16a, "B4" 16d, "C1" 22a, "C2" 22b, "C3" 22c, and "C4" 22d. The management device 14 in operations 50 through 60 in FIG. 9A also can generate the "red" multicast tree "T2" 104b comprising the root network device "A4" 20b, the intermediate nodes "B1" 16a and "B4" 16d as second forwarding network devices, and second leaf nodes "B2" 16b, "B3" 16c, "C1" 22a, "C2" 22b, "C3" 22c, and "C4" 22d.

The end result is that a breakage cannot prevent the forwarding along at least one of the trees.

Hence the Superspine nodes 10 can indicate which spine nodes 16 are relay and which are end nodes (e.g., leaf nodes 22) for the trees that it sources. The relays can advertise the root and the tree down in the routing protocol whereas the end nodes do not. In the case of a Fat Tree (or a Clos Network), the trees can be built as illustrated in FIG. 4, where the management device 14 can build trees starting at the spine. As described previously, the relays (i.e., forwarding devices) are selected so that a node that is designated a relay in one multicast tree (e.g., 104a) is designated a leaf on the other tree (e.g., 104b).

FIG. 9A also illustrates that the multicast trees 104a and 104b can be built based on distributed processing by the network devices in the fat tree network topology 100, as opposed to centralized building by the management device 14. For example, a parent (self-selected, for example, in operation 52) can select a child in operation 54; if needed in the case where the fabric (e.g., the tree topology) is heavily damaged, a parent (e.g., "A1" 20a) can select in operation 56 a collection of children, so that a child can cover southbound connectivity to all the grand children in operation 60. The role of a child 16 covering for a grandchild 22 can be accepted by the child 16 in a transactional manner, so that the child (e.g., "B2" 16b in operation 56 and/or "B1" 16a in operation 58) can refuse to act as a relay for any other parent, e.g., "B2" 16b in operation 56 accepts "A1" 20a as parent but rejects "A4" 20b as parent, while "B1" 16a accepts "A4" 20b as parent but rejects "A1" 20a as parent. In an alternate variation, the child may accept more than one parent but then can marks the parent as as mutually exclusive for the distribution of the same multicast flow.

As apparent from FIG. 4, the multicast distribution trees 104a and 104b never use a common link data link (drawn as thin lines in FIG. 1), such that any breakage inside one tree can only harm a leaf of another non-mutually-exclusive tree, so a breakage cannot block forwarding on both trees selected for a given multicast flow.

In a RIFT proposal, the root of the tree can be the Superspine node from which the computation started. But for particular applications where all nodes are aware of the tree, any node may serve as root.

The map server/resolver (e.g., LISP) 14 managing the fabric 100 can be updated of the status of the trees 104, enabling the management device 14 to allocate the (pair of) trees to be used in the fabric for a particular multicast flow. Hence, the management device 14 can identify the multicast trees 104 as a response to a lookup request to resolve the VxLAN tunnel endpoint for a lookup of a multicast address. The map server/resolver can be implemented in the management device 14, multiple distributed management devices 14, etc.; hence, in one example the MSMR (used to resolve VxLAN tunnel endpoints) can be separate and distinct from the one or more management devices 14 that create the redundant multicast trees and allocate multicast flows to the created multicast trees as described herein.

FIG. 5 illustrates a variation of FIG. 4, where a management device (14 of FIG. 4) (e.g., executing a map server/map resolver (MSMR)) selecting a pair of trees to be used in the fabric for a particular multicast flow. In particular, the map server/map resolver (MSMR) (14 of FIG. 4) can select a root "A1" 20a, "C1" 20c in (each of) the tree(s) 104a, 104b and establish the roots "A1" 20a and/or "C1" 20c as VxLAN egress(es). In a Fat Tree, the root is typically a spine node (e.g. "A1" 20a for the "black" multicast tree "T1" 104a in FIG. 14 rooted by the upper left candidate root network device 20a) though it does not have to be (e.g., "C 1" 20c for the "red" multicast tree "T2" 104b rooted by the lower left network device "C 1" 20c). Hence, the "black" multicast tree "T1" 104a in FIG. 5 comprises the root "A1" 20a, the forwarding network devices "B2" 16b and "B3" 16c, and leaf devices "B1" 16a, "B4" 16d, "C2" 22b, "C3" 22c, "C4" 22d, and "A4" 22e; the "red" multicast tree "T2" 104b in FIG. 5 comprises the root "C1" 20c, the forwarding network devices "B1" 16a and "B4" 16d, and the leaf devices "B2" 16b, "B3" 16c, "C2" 22b, "C3" 22c, "C4" 22d, and "A4" 22e.

In another particular feature of the example embodiments, if there is one tree 104 and it is split in case of a breakage, then the MSMR (executed, for example, by the management device 14) may use the split tree as two (2) trees, and select a root in each one.

Forwarding packets along a tree requires the nodes to be aware of their neighbors. Hence, assuming in FIG. 9B that a multicast packet for a given multicast flow "(*,G)" (e.g., advertisement packet, data traffic packet, etc.) is injected into the fat tree network topology 100, the ToF devices 10 can share the multicast packet between each other in operation 62. Each ToF device allocated as a root for the given multicast flow "(*,G)" (e.g., "A1" 20a and "A4" 20b of FIG. 4) in operation 64 can copy all the neighbors that are part of the tree but the one from which the packet came. This creates an oriented distribution tree per root per tree, one black multicast tree "T1" 104a and one red multicast tree "T2" 104b illustrated in FIGS. 4, 5, 10A and 10B.

FIG. 6 illustrates leaf network devices 22 and intermediate network devices 16 flooding messages (e.g., multicast packets, membership advertisements, etc.) northwards toward the roots 20a, 20b of the multicast trees 104a, 104b.

Figure 9B:
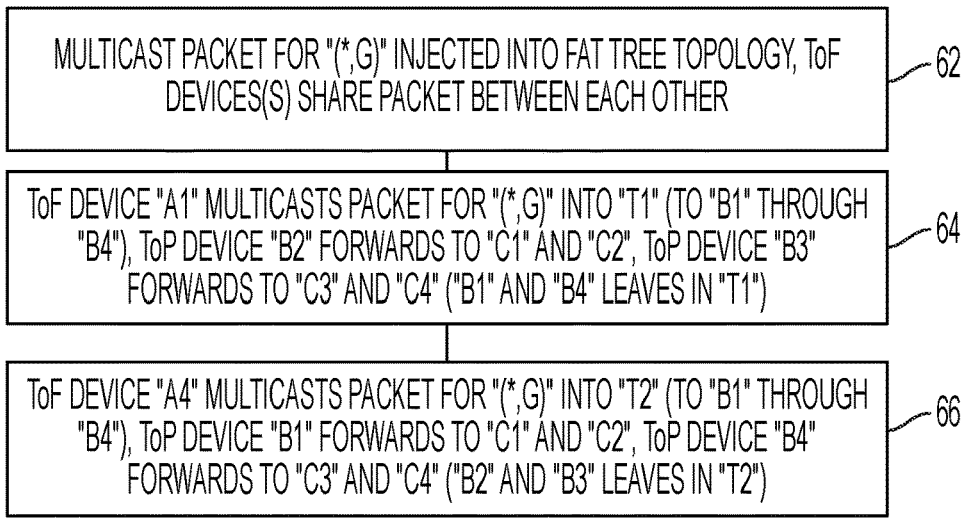
Figure 9C:
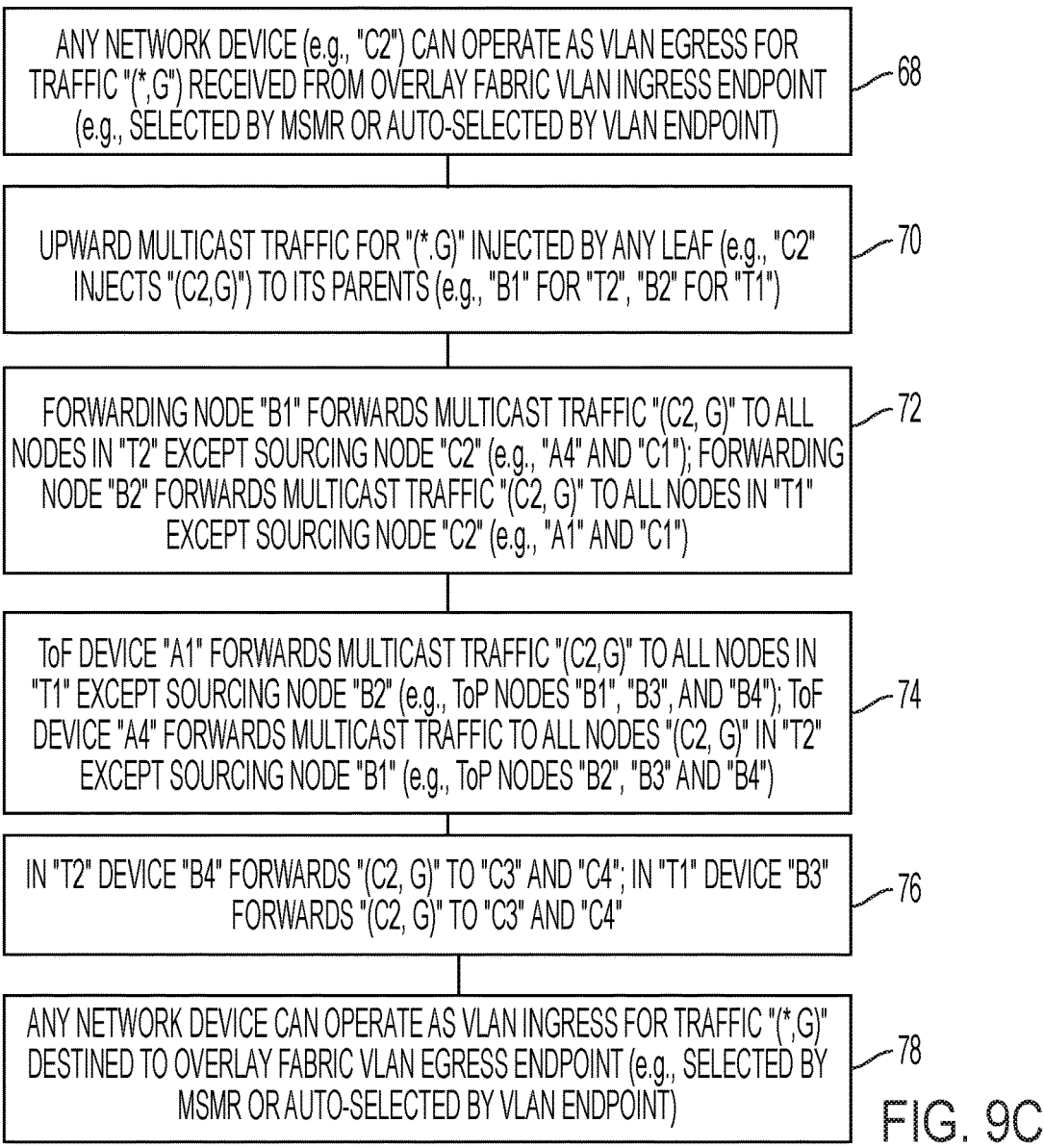

Hence, the ToF device "A1" 20a in operation 64 of FIG. 9B multicasts the packet for "(*,G)" into the multicast tree "T1" 104a (i.e., to the devices "B1" 16a through "B4" 16d). The ToP device "B2" 16b in operation 64 responds by forwarding the data packet to leaf devices "C1" 22a and "C2" 22b. The ToP device "B3" 16c in operation 64 responds by forwarding the data packet to leaf devices "C3" 22c and "C4" 22d. The devices "B 1" 16a and "B4" 16d do not forward the received multicast data packet because they are leaves in the multicast tree "T1" 104a.

The ToF device "A4" 20b in operation 66 of FIG. 9B multicasts the data packet for "(*,G)" into the multicast tree "T2" 104b (i.e., to devices "B1" 16a through "B4" 16d). The ToP device "B1" 16a in operation 66 responds by forwarding the data packet to leaf devices "C1" 22a and "C2" 22b. The ToP device "B4" 16d responds by forwarding the data packet to leaf devices "C3" 22c and "C4" 22d. The devices "B2" 16b and "B3" 16c do not forward the received multicast data packet because they are leaves in the multicast tree "T2" 104b.

FIG. 6 illustrates leaf network devices 22 and intermediate network devices 16 flooding messages (e.g., multicast packets, membership advertisements, etc.) northwards toward the roots 20a, 20b of the multicast trees 104a, 104b. In some cases such as the RIFT proposal, the management device 14 can constrain membership flooding (northwards) to the multicast tree(s). But this option forces the nodes including the leaves to know which is the root (rendezvous point (RP)) and the associated rendezvous point address (RPA) for a particular multicast group so as to use the correct tree: the management device 14 can supply this information (e.g., RPA) each of the devices in the fat tree network topology 100 (including the leaves 22), causing the leaves 22 to identify the appropriate root 20 for a particular multicast group, thereby causing use of the correct tree 104. The RPA can be associated with a particular router device, or an address that is used in the fat tree network topology 100 and not bound to any particular network device (e.g., a virtualized address). The link that the RPA is referred as a Rendezvous Point Link (RPL), and can be a loopback or a network interface (e.g., a LAN interface). Hence, the information sent by a management device 14 and/or a root network device 20 can establish subtrees rooted at the RPL devices (e.g., routers on the Rendezvous Point Link), causing southwards devices to join the subtrees, and causing the RPL to join the subtrees into a tree. Consequently, upstream traffic toward the RPA eventually will arrive at the RPL devices 20.

For example, each of the network devices 16 and 22 can be configured for flooding multicast advertisement messages northward according to Bi-directional Protocol Independent Multicast (BIDIR-PIM) (i.e., PIM-BIDIR) according to the IETF Request for Comments 5015. Hence, the multicast advertisement messages can be used to generate the multicast tree "T1" 104a and/or the multicast tree "T2" 104b based on multicast advertisement messages from any network device, including a leaf device "C22" 22b, illustrated in FIGS. 10A and 10B, based on the rule that a message is forwarded to all available links except for the incoming link having supplied the message.

Figure 10A:
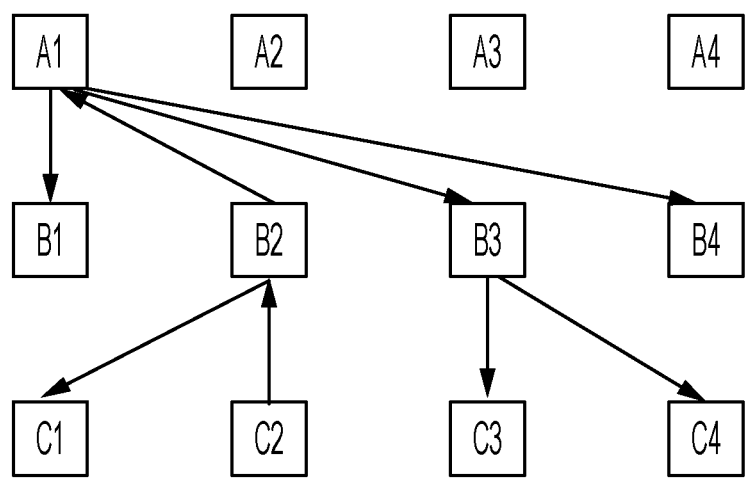
FIGS. 10A and 10B illustrate an example propagation of a multicast packet via the redundant multicast trees, according to an example embodiment.
Figure 10B:
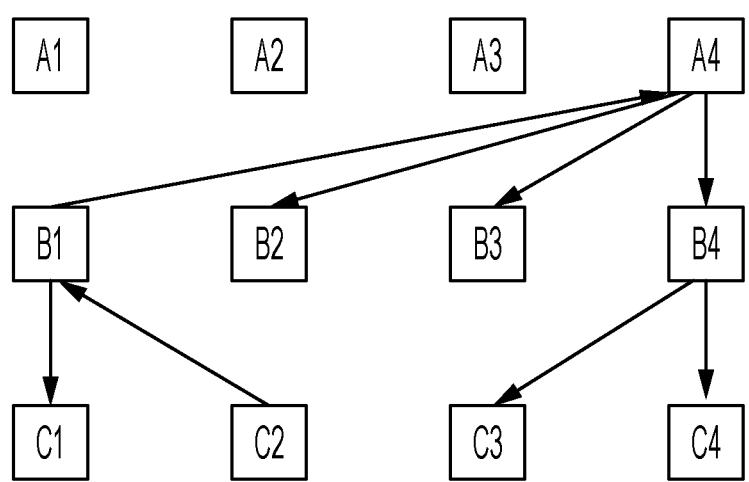

FIG. 10A illustrates a leaf device "C2" 22b multicasting in operation 70 a data packet (e.g., for "(*,G)") into the multicast tree "T1" 104a, and FIG. 10B illustrates the leaf device "C2" 22b multicasting in operation 70 the same data packet into the redundant multicast tree "T2" 104b of the fat tree network topology 100. For example, the leaf device "C22" 22b in operation 68 can be configured (e.g., dynamically by itself, another network device, and/or via allocation by the management device 14) as a VxLAN egress endpoint for a VxLAN tunnel 106 to another fat tree network topology 100b and/or 100c, illustrated in FIG. 11. A message output by the leaf device "C22" 22b in operation 70 along the multicast tree "T1" 104a in FIG. 10A is received by its parent "B2" 16b, and the same message output by the leaf device "C22" 22b in operation 70 along the multicast tree "T2" 104b in FIG. 10B is received by its parent "B1" 16a. Each forwarding network device "B2" 16b and "B1" 16a in FIGS. 10A and 10B multicasts in operation 72 the data packet (e.g., for multicast traffic "(C2,G)") to each of its neighbors along the respective multicast trees 104a and 104b, except along the link having sent the data packet (i.e., back to the source leaf device "C22" 22b); hence, the forwarding network device "B1" 16a in FIG. 10B in operation 72 multicasts the data packet to the ToF device "A4" 20b and the leaf network device "C1" 22a in the multicast tree "T2" 104b, and the forwarding network device "B2" 16b in FIG. 10A in operation 72 multicasts the data packet to ToF device "A1" 20a and the leaf network device "C1" 22a in the multicast tree "T1" 104a. The forwarding network devices 16a and 16b also can flood the multicast data packet (in case of an advertisement message during distributed formation of the multicast trees 104) to peer intermediate network devices "B3" 16c and "B4" 16d, as appropriate.

Each ToF device "A1" 20a and "A4" 20b in operation 74 can multicast the received data packet (e.g., for multicast traffic "(C2,G)") to each of its neighbors along the associated multicast tree 104 (except for the source having transmitted the data packet), such that the ToF device "A1" 20a multicasts the data packet to ToP devices "B1" 16a, "B3" 16c, and "B4" 16d in the multicast tree "T1" 104a (and not the sourcing ToP device "B2" 16b), and the ToF device "A4" 20b multicasts the data packet to ToP devices "B2" 16b, "B3" 16c, and "B4" 16d in the multicast tree "T2" 104b (and not the sourcing ToP device "B1" 16a). ToF device "A1" 20a and "A4" 20b also can forward the data packet to peer ToF devices "A2" and "A3", as appropriate.

The ToP device "B4" 16d in operation 76 multicasts the received data packet (e.g., for multicast traffic "(C2,G)") to its children "C3" 22c and "C4" 22d in the multicast tree "T2" 104b, and the ToP device "B3" in operation 76 multicasts the received data packet to its children "C3" 22c and "C4" 22d in the multicast tree "T1" 104a. As described previously, the ToP devices "B1" 16a and "B4" 16d are leaf devices in the multicast tree "T1" 104a and do not forward the packet further in the multicast tree "T1" 104a, and the ToP devices "B2" 16b and "B3" 16c are leaf devices in the multicast tree "T2" 104b and do no forward the packet further in the multicast tree "T2" 104b.

Hence, the propagation of the multicast message throughout the redundant multicast trees 104 enables any network device in the fat tree network topology 100 to operate in operation 78 as a VLAN ingress endpoint for traffic "(*,G)" destined for an overlay fabric VLAN egress endpoint: the ingress endpoint can be selected by the management device 14 and/or auto-selected by the VLAN egress endpoint, as appropriate.

As apparent from the foregoing, the example embodiments enable deployment of multiple redundant multicast trees in a fat tree topology, also referred to as a "CLOS" topology, for reliable delivery of multicast traffic.

Figure 7:
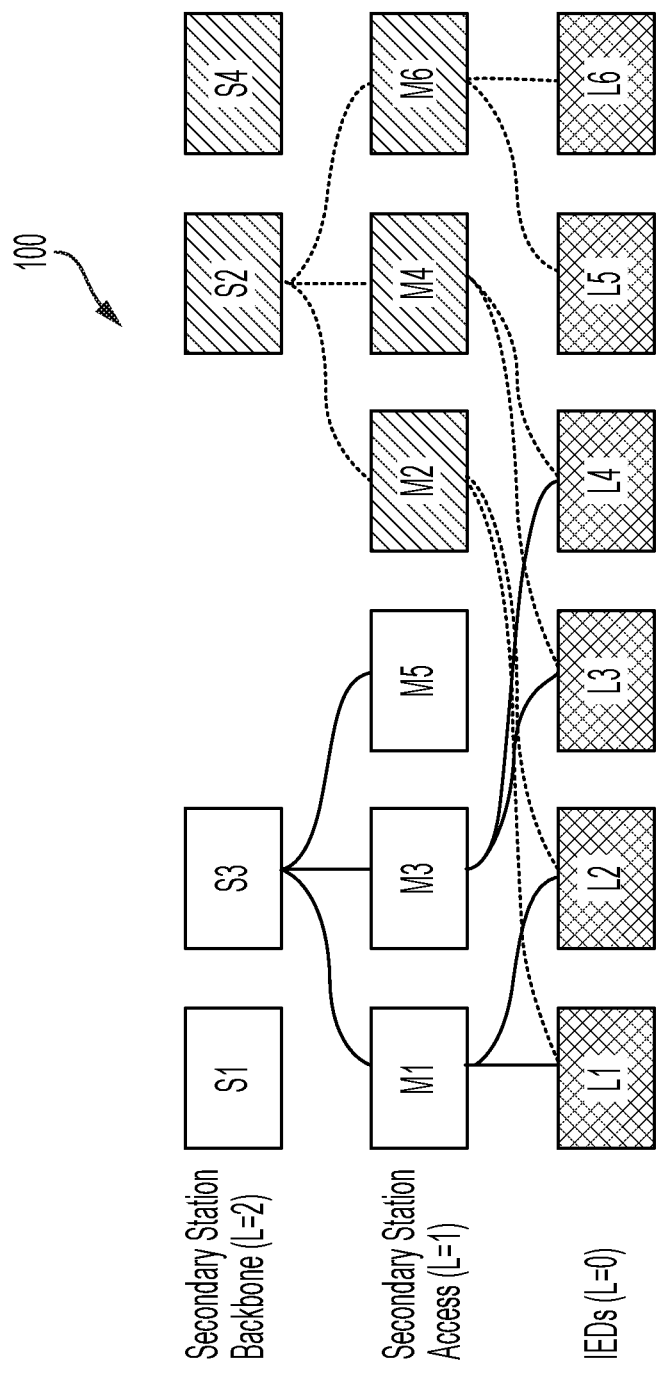
FIG. 7 illustrates computing multicast trees in different control planes, causing the multicast trees to be non congruent.

FIG. 7 illustrates the management device 14 applying multiple multicast trees to a secondary smart grid substation. In that case, a degenerate variation is proposed whereby a 2-planes canonical Clos is put together for the backbone and access layers, while the IEDs form a third layer. That third layer acts as leaves in this example. The planes are illustrated below as a blue (dark) and a red (shaded) plane, and the planes only meet at the level of the IEDs, since they are suited for end-to-end redundancy protocols such as PRP and HSR. Hence, FIG. 7 illustrates the management device computing the trees in different planes, which makes the trees non congruent by definition.

According to example embodiments, a management device can generate redundant multicast trees in a Fat Tree topology that covers all the leaves and possibly spine and super spine, in a manner that a node is a forwarder in one tree then it is a leaf in the other tree. Hence, a breakage cannot prevent the forwarding of a data packet along at least one of the trees.

Figure 8:
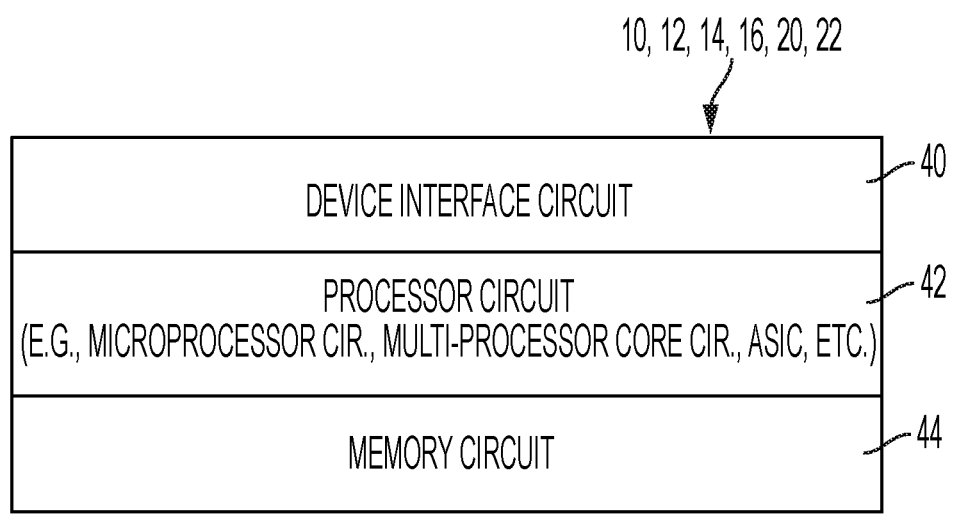
FIG. 8 illustrates an example implementation of any of the devices in the Figures, according to an example embodiment.

FIG. 8 illustrates an example implementation of any one of the network devices 10, 12, 14, 16, 20, and/or 22, according to an example embodiment. The apparatus 10, 12, 14, 16, 20, and/or 22 is a physical machine (i.e., a hardware device) configured for implementing network communications with other physical machines data network 10 illustrated in the Figures. The term "configured for" or "configured to" as used herein with respect to a specified operation refers to a device and/or machine that is physically constructed and arranged to perform the specified operation.

Each apparatus 10, 12, 14, 16, 20, and/or 22 can include a device interface circuit 40, a processor circuit 42, and a memory circuit 44. The device interface circuit 40 can include one or more distinct physical layer transceivers for communication with any one of the other devices 10, 12, 14, 16, 20, and/or 22; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 10, 12, 14, 16, 20, and/or 22 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit (s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Figure 11:
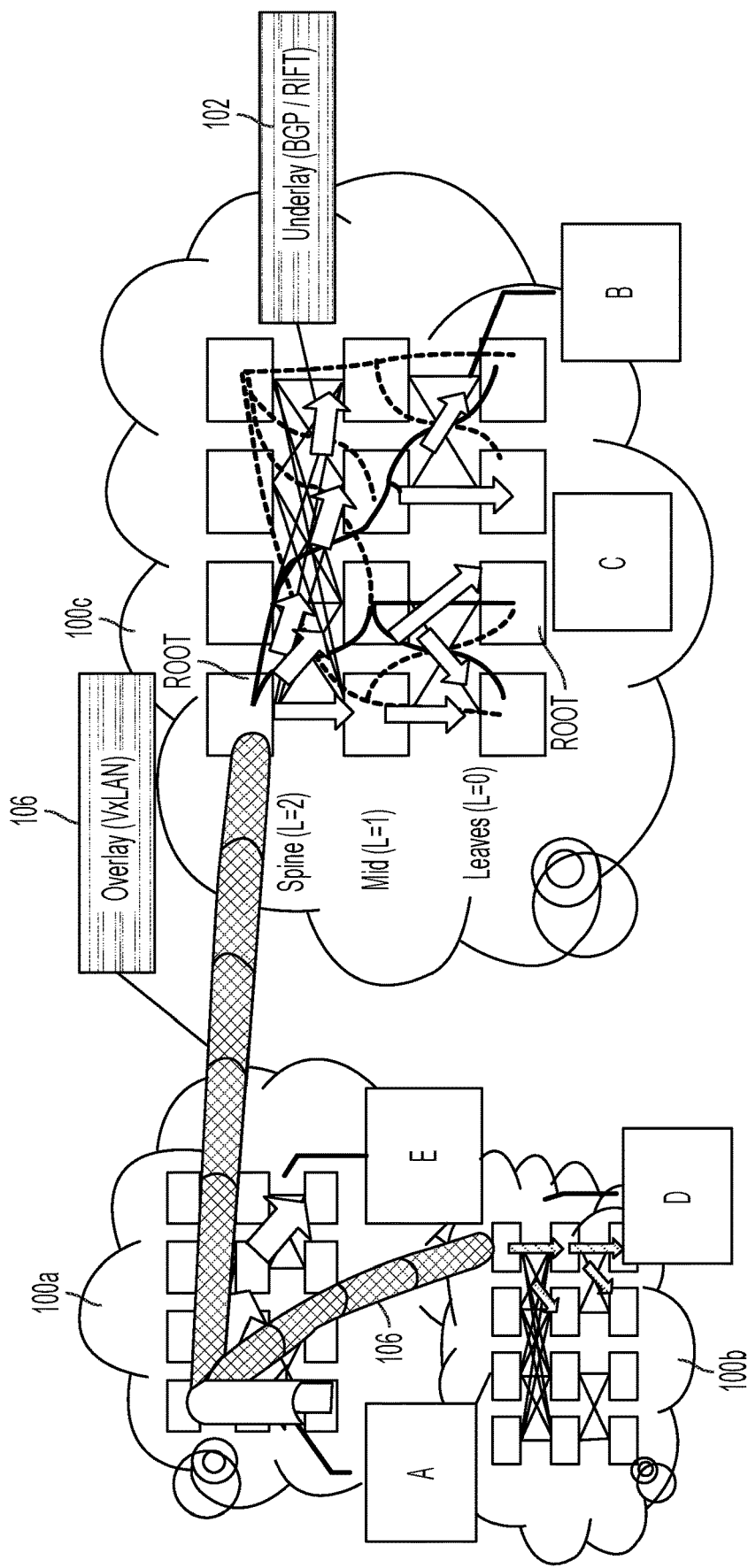
FIG. 11 illustrates a network device in the fat tree topology operable as a VxLAN endpoint for VxLAN that forms an overlay tree topology with other underlay network fabrics having respective network topologies.

FIG. 11 illustrates a network topology constructed so as to extend an overlay as a tree that joins the roots in multiple fat trees 100a, 100b, and 100c and enables cloud interconnection. If there are more than one tree (e.g., a distributed fabric) then as illustrated in FIG. 11 the VxLAN is point to multipoint, ending at the roots of each tree, e.g., it is a collection of classical VxLANs and the ingress makes a copy on each one. According to example embodiments, an underlay distribution system is leveraged at the exit edge of the overlay. A cloud structure is deployed using one or more physical data centers based on a distribution of underlay fabrics. The underlay may be Layer 2, but Layer-3 can be used with E-BGP, BGP-LS and RIFT (and/or the RIFT proposal). The overlay may be controlled, for example, using SDN or LISP, and/or VxLAN as an example of encapsulation. In one embodiment, the VxLAN endpoints can be found using a SISF function snooping protocol. Using Cisco® Software-Defined Access (SDA) (commercially available from Cisco Systems, San Jose, Calif.), endpoint network devices ("endpoints") can be found by the SISF function snooping protocols like ARP and IPv6 ND, and LISP is used as mapper/resolver. Unicast IP packets are encapsulated between the ingress switch and the egress switch. This model as illustrated in FIG. 11 is expected to eliminate the need of supporting broadcast in the system. In effect, this solves most situations, but does not provide a broadcast/multicast operation. The question becomes how to support multicast and broadcast.

FIG. 11 illustrates how the roots of the underlay trees can be interconnected using an overlay technology, to continue the multicast across the intercloud. The roots of trees in different fabrics are meshed in the overlay, typically forming a tree, but also possibly a more connected mesh with a spanning tree inside for the operation described below.

In the example of FIG. 11, a multicast packet is injected by Node A using a VxLAN to the root in its local fabric. Using the local underlay, the root sends the packet to local node E that subscribed to the multicast. Nodes B, C, and D in other remote fabrics also subscribed to A's multicast flow.

In one embodiment, the roots of the multicast trees in the corresponding fat trees synchronize a database of listeners. This can be done by classical flooding/link state sync along the overlay of the roots. This way, Root in Node A's tree knows that it needs to send the multicast packet to the other roots. The multicast packet is encapsulated across the overlay.

The receiving root de-capsulates the overlay tunnel as the root in A's fat tree did, and distributes locally. If needed, it also propagates along the overlay multicast tree, excluding the tunnel from which it got the packet.

Hence, redundant trees can extend the overlay and the underlay.

Figure 12A:
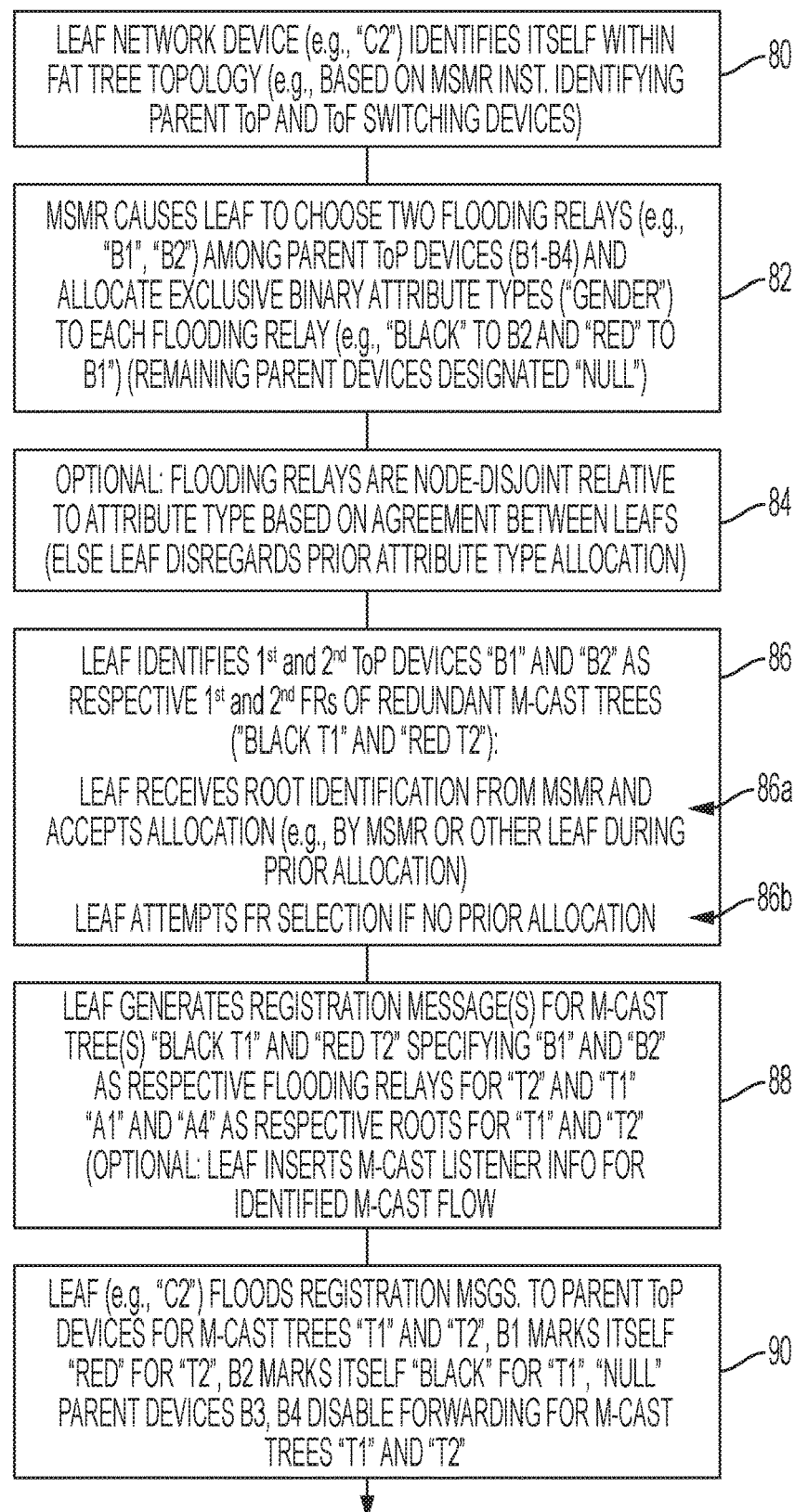
FIGS. 12A-12C illustrate an example method for a leaf-initiated establishment of first and second redundant multicast trees in a fat tree network topology, according to an example embodiment.
Figure 12B:
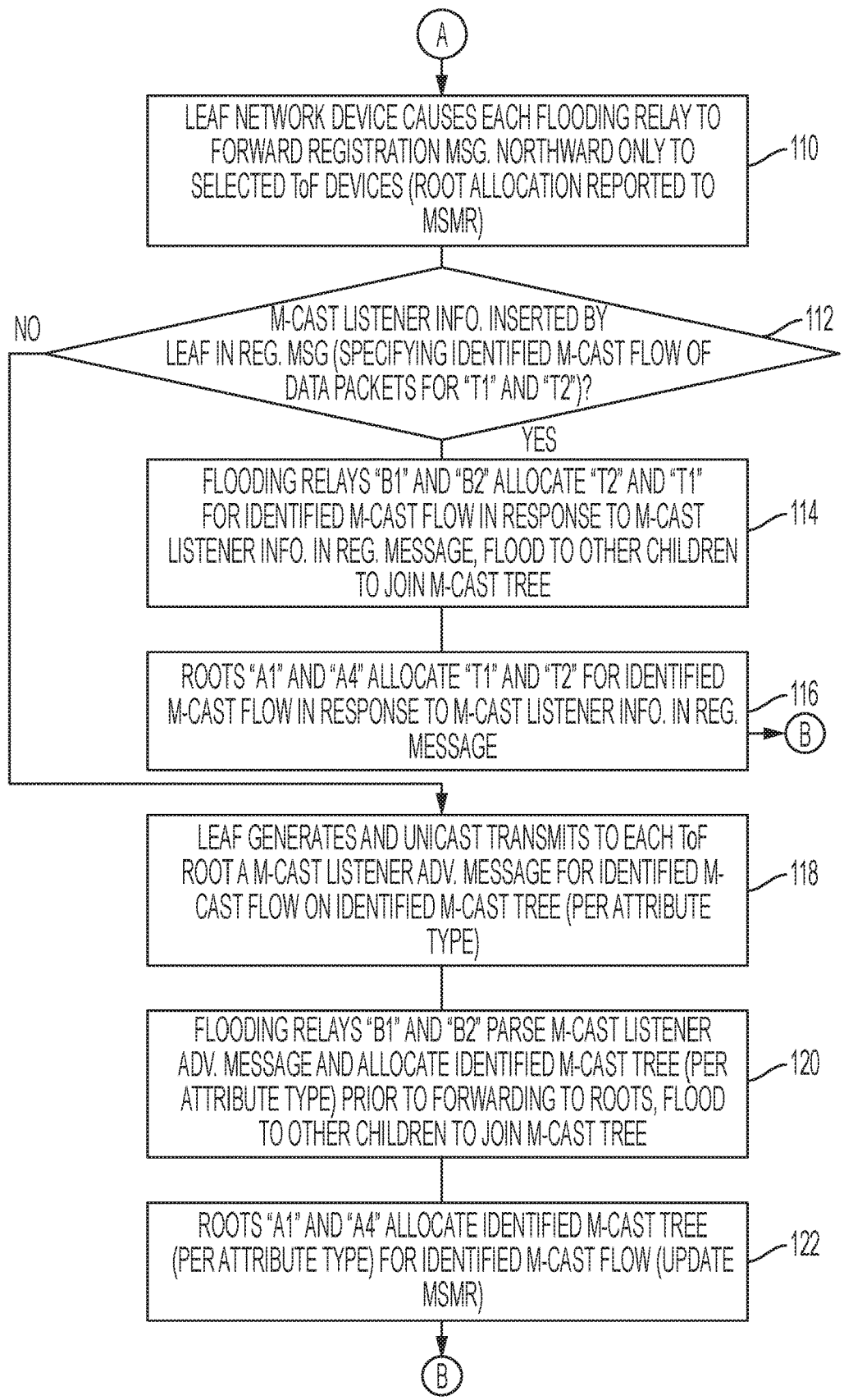
Figure 12C:
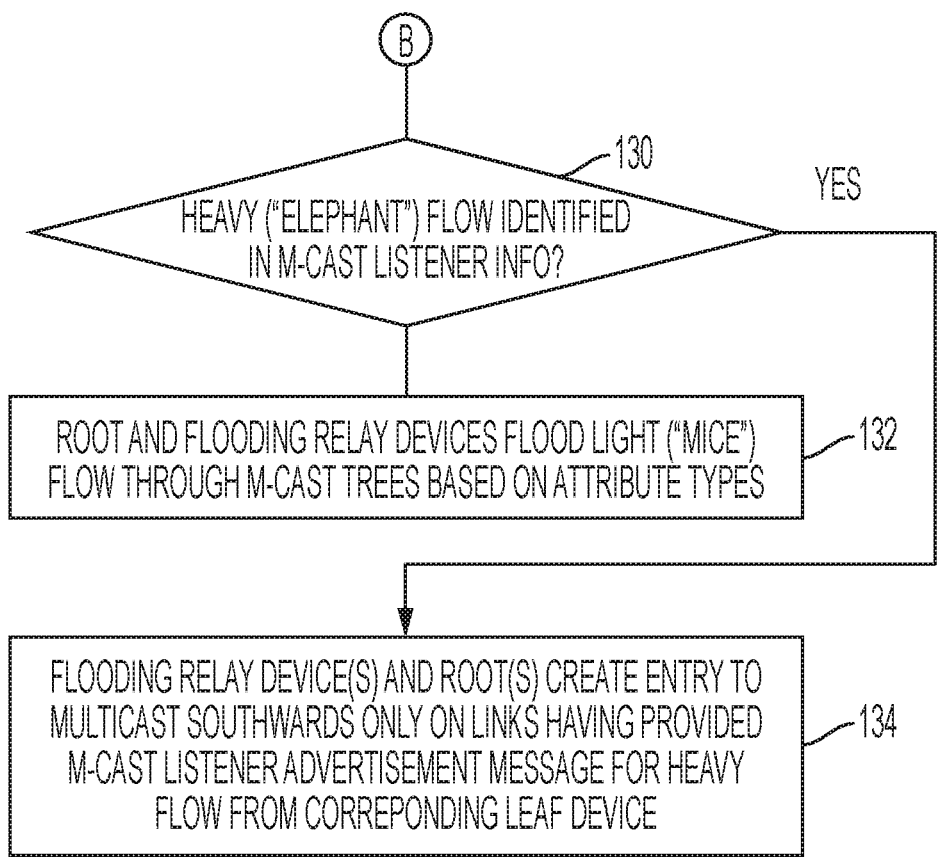

FIGS. 12A-12C illustrate an example method for a leaf-initiated establishment of first and second redundant multicast trees in a fat tree network topology, according to an example embodiment. As described in further detail below, the example method of FIGS. 12A-12C can be executed under the control of the management device 14, for example in accordance with the above-identified RIFT proposal; alternately, the example method of FIGS. 12A-12C can executed in a distributed manner by one or more leaf network devices 12 or 22 according to coordinated operations, for example in accordance with the above-identified RIFT proposal.

As described previously, a network device (e.g., "C2" in FIGS. 3, 4) 22 in operation 80 can identify itself as a leaf network device 22 within a fat tree network topology 100 based on received information from the management device 14. As described previously, the management device 14 can arrange the fat tree network topology 100 as comprising a ToF layer of ToF switching devices 10, an intermediate layer of intermediate switching devices 16 connected to each of the ToF switching devices 10, and a layer of leaf network devices 22 (operation 50 of FIG. 9A). The management device 14 also can send instructions to each of the devices in the fat tree network topology 100 (including RPA information for a particular multicast group) of identification of appropriate flooding relays (FRs) and/or root network devices for one or more multicast trees.

Hence, the processor circuit 42 of the leaf network device "C2" 22b can receive from the management device 14, executing for example an MSMR, instructions identifying its available parent switching devices (e.g., "B1, B2, B3, B4") in the intermediate layer of intermediate switching devices 16, and optionally available ToF switching devices 10 in the ToF layer (e.g., in the case of VxLAN endpoint identification, described below). The network device (e.g., "C2") also can identify itself as a leaf network device 22 based on the instructions from the management device (and/or MSMR) 14, based on instructions received during zero-touch provisioning (ZTP), and/or based on other discovery operations.

The instructions received from the management device 14 (or discovery operations executed by the leaf network device 22) in operation 80 can cause the processor circuit 42 of the management device 14 and/or the leaf network device "C2" 22b to initiate, in operation 82, establishment of first and second redundant multicast trees (e.g., "T1" 104a and "T2" 104b of FIG. 4) for multicasting of data packets. The processor circuit 42 of the management device 14 can cause the processor circuit 42 of the leaf network device "C2" 22b in operation 82 to choose two flooding relays (FRs) (e.g., "B1", "B2") among the available ToP switching devices, and allocate distinct binary attribute types (e.g., "gender") to each flooding relay. In particular, the leaf network device "C2" 22b can select the intermediate switching device "B1" and "B2" as respective first and second flooding relays, illustrated in FIGS. 3 and 4, where the first flooding relay "B1" is identified by the leaf network device "C2" 22b as belonging to the first attribute type "Red" for the "red" multicast tree "T2" 104b and the second flooding relay "B2" as belonging to the second distinct attribute type "Black" for the "black" multicast tree "T1" 104a.

As described previously, the selection of the first and second attribute types "black" (or "male") and "red" (or "female") by the leaf network device "C2" 22b can define binary attribute types (or "genders") for establishment of the first and second redundant multicast trees 104a and 104b according to a link-disjoint topology, i.e., a given link is allocated one and only one attribute type among the "black" multicast tree "T1" 104a and the "red" multicast tree "T2" 104b.

The leaf network device "C2" 22b in operation 82 also can select any other connected intermediate switching devices (e.g., "B3" or "B4") 16 as "null" relays relative to the leaf network device "C2" 22b and the first and second multicast trees 104a and 104b. In particular, the leaf network device "C2" 22b can designate that the other intermediate switching devices (e.g., "B3" or "B4") are "null" devices that should not forward any multicast packet to the leaf network device "C2" 22b for any multicast flow allocated to the multicast trees 104a or 104b. The switching devices "B3" and "B4" still can be designated as flooding relays by other leaf network devices (e.g., "C3" or "C4").

The leaf network device "C2" 22b in operations 84 and 86 also can allocate the binary attribute types for the flooding relays (as selected in operation 82) based on an agreement between the leaf network devices (or in accordance with instructions from the management device (e.g., MSMR) 14), for example in a case where the flooding relays have been previously allocated by another leaf network device (e.g., "C1"), resulting in the multicast trees 104a and 104b having node-disjoint membership (i.e., each flooding relay is allocated one and only one "type" or "gender" among the multicast trees 104a and 104b). Alternately, the leaf network device "C2" 22b can disregard any prior attribute type allocation, and select an intermediate switching device (e.g., "B1") 16 as having a first attribute type ("red") despite another leaf network device (e.g., "C5", not shown in the Figures) having selected the intermediate switching device (e.g., "B 1") 16 as having the second distinct attribute type ("black"), resulting in multicast trees 104a, 104b that are not node-disjoint at the intermediate layer.

Hence, the leaf network device "C2" 22b in operation 86 also can select a first ToP switching device (e.g., "B1") 16 as a corresponding flooding relay of the first ("black") multicast tree 104a, and a second ToP switching device (e.g., "B2") as the corresponding flooding relay of the second ("red") multicast tree 104b, based on receiving in operation 86a the identification parameters from the management device 14 (and/or the corresponding ToP switching device 16) as described previously, and accepting the prior allocation of the ToP switching devices "B1" and "B2" as the first and second flooding relays of the multicast trees 104a and 104b according to the respective attribute types "black" and "red".

The leaf network device "C2" 22b in operation 86b also can attempt flooding relay selection (and attribute selection) if there has been no prior allocation, for example based on the leaf network device "C2" 22b executing its own selection: if a given ToP switching device 16 has already been allocated a different "gender" or "type", the leaf network device "C2" 22b can either accept the allocated "gender"/"type", attempt selection of another ToP switching device 16 that has not yet been allocated a "gender" or "type" as attempted by the leaf network device "C2" 22b, or disregard the prior allocation as described previously.

Hence, the processor circuit 42 of the leaf network device "C2" 22b in operation 88 can generate and flood one or more registration messages for establishing the multicast trees 104a and 104b. For example, the leaf network device "C2" 22b in operation 88 can generate a first registration message that specifies that the intermediate network device "B 1" is a "red" flooding relay, and the ToF device "A4" is a "red" root "Root B" for the "red" multicast tree "T2" 104b; the leaf network device "C2" 22b in operation 88 also can generate a second registration message that specifies that the intermediate network device "B2" is a "black" flooding relay, and the ToF device "A1" is a "black" root "Root A" for the "black" multicast tree "T1" 104a. Alternately, the leaf network device "C2" 22b in operation 88 can combine the contents of the first and second registration messages into a single registration message for the redundant multicast trees 104a and 104b, the single registration message specifying that the intermediate network device "B 1" is a "red" flooding relay and the ToF device "A4" is a "red" root "Root B" for the "red" multicast tree "T2" 104b, and that the intermediate network device "B2" is a "black" flooding relay and the ToF device "A1" is a "black" root "Root A" for the "black" multicast tree "T1" 104a.

As described below with respect to FIG. 12B, leaf network device "C2" 22b also can insert, into the registration messages, multicast ("m-cast") listener information for an identified multicast flow (e.g., "(*, G)") on a per-attribute basis.

Hence, the leaf network device "C2" 22b in operation 90 can flood the one or more registration messages to its parent ToP devices 16 "B1", "B2", etc. The registration message(s) generated and output by the leaf network device "C2" 22b can cause the ToP switching device "B1" 16a to allocate itself as a "red" flooding relay for the "red" multicast tree "T2" 104b; the registration message(s) also can cause the ToP switching device "B2" to allocate itself as a "black" flooding relay for the "black" multicast tree "T1" 104a; any remaining ToP switching devices receiving the registration message(s) can mark themselves as "null" parent devices and disable forwarding for the multicast trees 104a and 104b (based on either explicit "null" designation in the registration message or implicit "null" identification based on an identified absence of any identifier by the corresponding parent device in the registration message).

Referring to FIG. 12B, the flooding of the registration message(s) by the leaf network device "C2" 22b in operation 90 causes the flooding relays "B1" and "B2" in operation 110 to limit propagation of the registration message(s) to only the ToF switching devices 20 that are allocated as roots of the multicast trees (as described previously for example in operations 52 and 54 of FIG. 9A), for example the ToF switching devices "A4" and "A1", respectively. As described previously, the roots can be selected by the management device 14, an MSMR, can be selected based on distributed processing among the ToF switching devices 20, and/or based on selection by one or more of the ToP switching devices 16. In contrast to the intermediate layer of intermediate switching devices 16, the roots must be node-disjoint for the respective multicast trees 104a and 104b.

Hence, the "red" flooding relay "B1" forwards the registration message (for the "red" multicast tree "T2" 104b) only to the ToF switching device "A4" for allocation as the "red" "Root B" for the "red" multicast tree "T2" 104b; the "black" flooding relay "B2" forwards the registration message (for the "black" multicast tree "T1" 104a) only to the ToF switching device "A1" for allocation as the "black" "Root A" for the "black" multicast tree "T1" 104a. The flooding relays "B1" and "B2" also can flood the registration message(s) southward to any attached child network devices (except the originating leaf network device "C2" 22b) to enable other leaf network devices to join the multicast trees 104a and 104b.

Hence, the received registration message (generated by the leaf network device "C2" 22b) can cause the first ToF switching device "A4" 20b in operation 110 to allocate itself and operate as the "red" root "Root B" for the first "red" multicast tree "T2" 104b, and the received registration message (generated by the leaf network device "C2" 22b) can cause the second ToF switching device "A1" 20a in operation 110 to allocate itself and operate as the "black" root "Root A" for the second "black" multicast tree "T1" 104a. The ToF switching devices "A1" and "A4" in operation 110 can report the respective root allocations "Root A" and "Root B" for the respective multicast trees 104a and 104b to the management device 14 (and/or the MSMR).

As described previously, the roots of the redundant multicast trees 104a and 104b must be node-disjoint. Hence, any inconsistency regarding allocation of a root for a particular attribute type is resolved by either a ToF switching device, the management device 14 (and/or the MSMR), and/or a ToP switching device 16, as appropriate.

The ToF switching devices "A1" and "A4" in operation 110 also can flood southwards the registration message for the respective multicast trees 104a and 104b, resulting in the propagation patterns illustrated in FIGS. 10A and 10B for the registration message. Hence, the ToP switching devices 16 can learn of the multicast trees 104a and 104b via the southward flooding, and in response flood the registration message to attached leaf network devices 22, enabling, all the network devices in the fat tree topology to learn of the creation of the multicast trees 104 and 104b, without the necessity of associating any multicast flow to any one of the formed multicast trees 104a and 104b.

Hence, the leaf network device "C2" 22b can initiate establishment of the first and second redundant multicast trees 104a and 104b based on allocating distinct "genders" or binary attribute types for the multicast trees and their associated members, including the root network devices and the intermediate network devices providing connectivity to leaf network devices. The foregoing illustrates that the leaf network device "C2" 22b can initiate establishment of the multicast tree "T1" 104a and multicast tree "T2" 104b (and even additional multicast trees), without identification of any multicast flow; hence, the leaf network device "C2" 22b can establish a plurality of groups of redundant multicast trees that can later be allocated for different identified flows (e.g., trees "black T1" and "red T2" for multicast flow "(S1, G1)"; trees "black T3" and "red T4" for multicast flow "(*, G)", etc.). However, as described with respect to operation 88, the leaf network device "C2" 22b also can provide multicast listener information for an identified multicast flow, for example based on the management device (e.g. MSMR) 14 supplying multicast information for a particular multicast group, for example in the form of an RPA.

Hence, if in operation 112 the leaf network device "C2" 22b inserted multicast listener information in the registration message(s) for an identified multicast flow of data packets (e.g., "(*,G)"), the multicast listener information in the registration message(s) can cause the flooding relays "B1" and "B2" in operation 114 to allocate the "red" multicast tree "T2" 104b and the "black" multicast tree "T1" 104a, respectively, for the identified multicast flow "(*,G)"; multicast listener information also can cause the flooding relays "B1" and "B2" in operation 114 to flood the multicast listener information to other child network devices, enabling the other child network devices to selectively join the redundant multicast trees 104a and 104b for the identified multicast flow "(*,G)".

The multicast listener information in the registration message(s) generated and output by the leaf network device "C2" 22b also can cause the root network devices "A1" and "A4" in operation 116 to allocate the "black" multicast tree "T1" 104a and the "red" multicast tree "T2" 104b, respectively, for the identified multicast flow "(*,G)". The ToF switching devices "A1" and "A4" in operation 116 also can flood southwards the multicast advertisements for the respective multicast trees 104a and 104b allocated for the identified multicast flow "(*,G)", resulting in the propagation patterns illustrated in FIGS. 10A and 10B, enabling other leaf network devices to join as multicast listeners for the identified multicast flow "(*,G)".

If in operation 112 the leaf network device "C2" 22b did not insert any multicast listener information in the registration message(s) generated and flooded in operations 88 and 90, the processor circuit 42 of the leaf network device "C2" 22b in operation 118 can generate and unicast to each ToF root "A1" and "A4" a multicast listener advertisement message for an identified multicast flow on an identified multicast tree according to the attribute type (e.g., "black" multicast tree "T1" 104a allocated for "(*,G)", "red" multicast tree "T2" 104b allocated for "(*,G)").

Hence, the multicast listener advertisement message(s) can cause the flooding relays "B1" and "B2" to parse in operation 120 the received multicast listener advertisement messages and allocate the multicast trees 104a and multicast tree "T2" 104b accordingly.

Similarly, the multicast listener advertisement message(s) can cause the roots "A1" and "A4" in operation 122 to allocate the identified multicast trees 104a and 104b for the identified multicast flow "(*,G)". The ToF switching devices "A1" and "A4" in operation 122 also can flood southwards the multicast advertisements for the respective multicast trees 104a and 104b allocated for the identified multicast flow "(*,G)", resulting in the propagation patterns illustrated in FIGS. 10A and 10B, enabling other leaf network devices to join as multicast listeners for the identified multicast flow "(*,G)".

Hence, the registration message(s) that identify a multicast flow can cause the first flooding relay "B1" and the first ToF switching device "A4" to allocate the first "red" multicast tree 104b, for multicasting of the identified multicast flow "(*,G)" to multicast listeners via first tree members associated with the first "red" attribute type, as illustrated in FIGS. 4 and 10B. The registration messages further cause the second flooding relay "B2" and the second ToF switching device "A1" to allocate the second "black" multicast tree 104a for redundant multicasting of the identified multicast flow "(*,G)" to the multicast listeners via second tree members associated with the second "black" attribute type, as illustrated in FIGS. 4 and 10A.

Hence, other leaf network devices can detect and listen for the identified multicast group based on the roots "Root A" and "Root B" flooding the multicast listener advertisement information for the identified multicast flow via the redundant multicast trees 104a and 104b established by the leaf network device "C2" 22b. The member devices of the multicast trees 104a and 104b can flood the multicast traffic in the case of "mice" flows having relatively small payload sizes that consume relatively small amounts of bandwidth in the fat tree network topology 100.

In contrast, the leaf network device "C2" 22b, as part of generating and transmitting the multicast listener information in operations 112 and/or 118 can specify a heavy flow indicator indicating if an identified multicast flow is a "heavy" flow (e.g., "elephant" flow) that requires substantial network bandwidth.

Hence, if a flooding relay (e.g., "B1" or "B2") or a root (e.g., "A1" or "A4") detects in operation 130 of FIG. 12C that there is no "heavy" flow indicator in the received multicast listener information, the root and flooding relays can execute unrestricted flooding of the mice flows through the multicast trees 104a and 104b according to the binary ("gender") attribute types illustrated in FIG. 4.

If a flooding relay (e.g., "B1" or "B2") or a root (e.g., "A1" or "A4") detects in operation 130 that received multicast listener information identifies a heavy flow indicator identifying an identified flow as a heavy "elephant" flow, the flooding relay (e.g., "B1" or "B2") and/or root (e.g., "A1" or "A4") can create in operation 134 a local route table entry such that the root network device and/or the flooding relay forwards the identified "heavy" flow southward only on links having provided multicast listener advertisement messages for the identified "heavy" flow from corresponding leaf devices having registered as multicast listeners. Hence, the roots and flooding relays can limit multicasting of heavy flows to only those paths having registered multicast listeners. Hence, FIG. 12C illustrates that multicast paths for an identified heavy flow can be effectively "pruned" to avoid network congestion along paths having no listeners of the identified heavy flow.

Multicast listeners (e.g., host network devices connected to the leaf network devices) can register using various multicast protocols, for example IGMP for IPv4 traffic, Multicast Listener Discovery (MLD) for IPv6 traffic; hence, a given leaf network device 22 can respond to a received IGMP or MLD message by outputting northwards a multicast listener advertisement message for the identified multicast flow of data packets as described above with respect to operation 118.

As described previously with respect to FIG. 3, the leaf-initiated multicast trees 104a and 104b as described with respect to FIGS. 12A-12C enable the leaf network device "C2" 22b to inject an identified multicast flow of data packets into the "black" multicast tree "T1" 104a based on the leaf network device "C2" 22b tunneling the identified multicast flow of data packets to the root "Root A" via a VxLAN tunnel 106. In particular, the leaf network device "C2" 22b (and/or the MSMR) can create an ingress tunnel endpoint for the VxLAN tunnel 106 originating at the leaf network device "C2" 22b and an egress tunnel endpoint for the VxLAN tunnel 106 terminating at the root "Root A" of the "black" multicast tree "T1" 104a, for multicast traffic originated by the host network device "A" attached to the leaf network device "C2" 22b. The tunneling can cause the first ToF switching device "A1" as "Root A" to selectively multicast the identified multicast flow of data packets via the first multicast tree 104, based on whether the identified multicast flow is identified as a "heavy" ("elephant") flow or a "light" ("mice") flow as described previously. The VxLAN tunnels 106 can be established, for example, using Protocol Independent Multicast (PIM) Sparse-Mode as described in the IETF RFC 7761, eliminating the need to use PIM-BIDIR in the fat tree network topology 100.

The leaf network device "C2" 22b also can inject the identified multicast flow of data packets in to the "red" multicast tree "T2" 104b based on the leaf network device "C2" 22b tunneling, via a corresponding VxLAN tunnel 106, the identified multicast flow of data packets to the ToF device "A4" serving as the root "Root B" for the "red" multicast tree "T2" 104b. Hence, the leaf network device "C2" 22b can establish multiple VxLAN tunnels 106 exiting at the roots "Root A" and "Root B" for injecting multicast traffic into the redundant multicast trees 104a and 104b, respectively.

As described previously, all multicast flows (identified, for example, by associated multicast addresses) and all multicast trees can be registered with the management device 14, enabling the management device 14 to provide allocation information for any established multicast tree relative to any multicast flow injected into the fat tree network topology 100. Hence, redundant multicast trees can be arbitrarily allocated to identified multicast flows by the management device 14 for dynamic multicast distribution along the redundant multicast trees originated by one or more leaf network devices.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   identifying, by an apparatus, a fat tree network topology comprising a top-of-fabric (ToF) layer of ToF switching devices, an intermediate layer of intermediate switching devices connected to each of the ToF switching devices, and a layer of leaf network devices;
   causing, by the apparatus, a first of the leaf network devices to initiate establishment of first and second redundant multicast trees for multicasting of data packets, including:
   causing a first of the ToF switching devices to operate as a corresponding root of the first multicast tree, and a second of the ToF switching devices to operate as the corresponding root of the second multicast tree, the first multicast tree allocated a first attribute type and the second multicast tree allocated a second distinct attribute type,
   causing the first leaf network device to select first and second of the intermediate switching devices as respective first and second flooding relays, including causing the first leaf network device to generate and flood one or more registration messages identifying the first flooding relay as belonging to the first attribute type and the second flooding relay as belonging to the second distinct attribute type, and
   causing the first and second flooding relays to limit propagation of the one or more registration messages to the first and second ToF switching devices, respectively; and
   causing the leaf network device to inject an identified multicast flow of data packets into the first multicast tree based on the leaf network device tunneling the identified multicast flow of data packets to the root of the first multicast tree, the tunneling causing the first ToF switching device to selectively multicast the identified multicast flow of data packets via the first multicast tree.

2. The method of claim 1, wherein:
   the selecting of the first and second of the intermediate switching devices further comprises the first leaf network device selecting any other connected intermediate switching devices as null relays relative to the first and second multicast trees;
   the one or more registration messages causing the other connected intermediate switching devices to disable forwarding of any data packets, relative to the first and second multicast trees, based on the selection as null relays.

3. The method of claim 1, wherein the first leaf network device is the apparatus, the first leaf network device selecting the first and second intermediate switching devices as the respective first and second flooding relays of the first and second multicast trees, according to the respective first and second attribute types, based on one of:

determining the first and second intermediate switching devices have not been previously allocated as the respective first and second flooding relays of the first and second multicast trees according to the respective first and second attribute types; or accepting a prior allocation of the first and second intermediate switching devices as the respective first and second flooding relays of the first and second multicast trees according to the respective first and second attribute types.

4. The method of claim 1, wherein the first leaf network device selects the first intermediate switching device as the first flooding relay belonging to the first attribute type despite a second leaf network device having selected the first intermediate switching device as the first flooding relay belonging to the second attribute type for an identified multicast flow chosen by the second leaf network device.

5. The method of claim 1, wherein:
the one or more registration messages do not identify any multicast flow;
the method further comprises causing the first leaf network device to generate and unicast transmit, to the first ToF switching device via the first intermediate switching device, a multicast listener advertisement message for an identified multicast flow of data packets, the multicast listener advertisement message causing the first intermediate switching device and the first ToF switching device to allocate the first multicast tree for the identified multicast flow of data packets according to the first attribute type.

6. The method of claim 5, further including the first leaf network device inserting into the multicast listener advertisement message a heavy flow indicator for the identified multicast flow of data packets, the heavy flow indicator causing the first ToF switching device and each intermediate switching device in the first multicast tree to forward the identified multicast flow of data packets toward the layer of leaf network devices only if a corresponding leaf network device has output a corresponding multicast listener advertisement message for the identified multicast flow.

7. The method of claim 1, wherein:
the registration messages for the first and second flooding relays specify an identified multicast flow of data packets, the first and second attribute types defining binary attribute types for establishment of the first and second redundant multicast trees according to a link-disjoint topology and selectively according to a node-disjoint topology;
the registration messages causing the first flooding relay and the first ToF switching device to allocate the first multicast tree, for multicasting of the identified multicast flow of data packets to multicast listeners via first tree members associated with the first attribute type;
the registration messages further causing the second flooding relay and the second ToF switching device to allocate the second multicast tree for redundant multicasting of the identified multicast flow of data packets to the multicast listeners via second tree members associated with the second attribute type.

8. The method of claim 1, wherein the causing includes causing the first and second intermediate switching devices to flood the one or more registration messages toward attached leaf network devices other than the first leaf network device, the flooding toward the attached leaf network devices enabling any one or more of the attached leaf network devices to selectively join the first and second multicast trees.

9. The method of claim 8, wherein the one or more registration messages identify an identified multicast flow of data packets, enabling any one or more of the attached leaf network devices to selectively join as multicast listeners for redundant reception of the identified multicast flow of data packets via the first and second multicast trees according to the first and second attribute types.

10. An apparatus implemented as a physical machine, the apparatus comprising:
non-transitory machine readable media configured for storing executable machine readable code;
a device interface circuit configured for communications in a data network; and
a processor circuit configured for executing the machine readable code, and when executing the machine readable code operable for:
identifying a fat tree network topology comprising a top-of-fabric (ToF) layer of ToF switching devices, an intermediate layer of intermediate switching devices connected to each of the ToF switching devices, and a layer of leaf network devices; and
causing a first of the leaf network devices to initiate establishment of first and second redundant multicast trees for multicasting of data packets, including:
causing a first of the ToF switching devices to operate as a corresponding root of the first multicast tree, and a second of the ToF switching devices to operate as the corresponding root of the second multicast tree, the first multicast tree allocated a first attribute type and the second multicast tree allocated a second distinct attribute type,
causing the first leaf network device to select first and second of the intermediate switching devices as respective first and second flooding relays, including causing the first leaf network device to generate and flood one or more registration messages identifying the first flooding relay as belonging to the first attribute type and the second flooding relay as belonging to the second distinct attribute type, and
causing the first and second flooding relays to limit propagation of the one or more registration messages to the first and second ToF switching devices, respectively;
wherein the processor circuit is configured for causing the leaf network device to inject an identified multicast flow of data packets into the first multicast tree based on the leaf network device tunneling the identified multicast flow of data packets to the root of the first multicast tree, the tunneling causing the first ToF switching device to selectively multicast the identified multicast flow of data packets via the first multicast tree.

11. The apparatus of claim 10, wherein:
the processor circuit is configured for causing the first leaf network device to select any other connected intermediate switching devices as null relays relative to the first and second multicast trees;
the one or more registration messages causing the other connected intermediate switching devices to disable forwarding of any data packets, relative to the first and second multicast trees, based on the selection as null relays.

12. The apparatus of claim 10, wherein the apparatus is the first leaf network device, the processor circuit configured for selecting the first and second intermediate switching devices as the respective first and second flooding relays of the first and second multicast trees, according to the respective first and second attribute types, based on one of:

determining the first and second intermediate switching devices have not been previously allocated as the respective first and second flooding relays of the first and second multicast trees according to the respective first and second attribute types; or accepting a prior allocation of the first and second intermediate switching devices as the respective first and second flooding relays of the first and second multicast trees according to the respective first and second attribute types.

13. The apparatus of claim 10, wherein the processor circuit is configured for selecting the first intermediate switching device as the first flooding relay belonging to the first attribute type despite a second leaf network device having selected the first intermediate switching device as the first flooding relay belonging to the second attribute type for an identified multicast flow chosen by the second leaf network device.

14. The apparatus of claim 10, wherein:

the one or more registration messages do not identify any multicast flow;

the processor circuit configured for causing the first leaf network device to generate and unicast transmit, to the first ToF switching device via the first intermediate switching device, a multicast listener advertisement message for an identified multicast flow of data packets, the multicast listener advertisement message causing the first intermediate switching device and the first ToF switching device to allocate the first multicast tree for the identified multicast flow of data packets according to the first attribute type.

15. The apparatus of claim 14, wherein the processor circuit is configured for causing the first leaf network device to insert into the multicast listener advertisement message a heavy flow indicator for the identified multicast flow of data packets, the heavy flow indicator causing the first ToF switching device and each intermediate switching device in the first multicast tree to forward the identified multicast flow of data packets toward the layer of leaf network devices only if a corresponding leaf network device has output a corresponding multicast listener advertisement message for the identified multicast flow.

16. The apparatus of claim 10, wherein:

the registration messages for the first and second flooding relays specify an identified multicast flow of data packets, the first and second attribute types defining binary attribute types for establishment of the first and second redundant multicast trees according to a link-disjoint topology and selectively according to a node-disjoint topology;

the registration messages causing the first flooding relay and the first ToF switching device to allocate the first multicast tree, for multicasting of the identified multicast flow of data packets to multicast listeners via first tree members associated with the first attribute type;

the registration messages further causing the second flooding relay and the second ToF switching device to allocate the second multicast tree for redundant multicasting of the identified multicast flow of data packets to the multicast listeners via second tree members associated with the second attribute type.

17. The apparatus of claim 10, wherein the causing includes causing the first and second intermediate switching devices to flood the one or more registration messages toward attached leaf network devices other than the first leaf network device, the flooding toward the attached leaf network devices enabling any one or more of the attached leaf network devices to selectively join the first and second multicast trees.

18. One or more non-transitory tangible media encoded with logic for execution by a machine and when executed by the machine operable for:

identifying a fat tree network topology comprising a top-of-fabric (ToF) layer of ToF switching devices, an intermediate layer of intermediate switching devices connected to each of the ToF switching devices, and a layer of leaf network devices;

causing a first of the leaf network devices to initiate establishment of first and second redundant multicast trees for multicasting of data packets, including:

causing a first of the ToF switching devices to operate as a corresponding root of the first multicast tree, and a second of the ToF switching devices to operate as the corresponding root of the second multicast tree, the first multicast tree allocated a first attribute type and the second multicast tree allocated a second distinct attribute type, causing the first leaf network device to select first and second of the intermediate switching devices as respective first and second flooding relays, including causing the first leaf network device to generate and flood one or more registration messages identifying the first flooding relay as belonging to the first attribute type and the second flooding relay as belonging to the second distinct attribute type, and causing the first and second flooding relays to limit propagation of the one or more registration messages to the first and second ToF switching devices, respectively; and causing the leaf network device to inject an identified multicast flow of data packets into the first multicast tree based on the leaf network device tunneling the identified multicast flow of data packets to the root of the first multicast tree, the tunneling causing the first ToF switching device to selectively multicast the identified multicast flow of data packets via the first multicast tree.

19. The one or more non-transitory tangible media of claim 18, wherein the first leaf network device selects the first intermediate switching device as the first flooding relay belonging to the first attribute type despite a second leaf network device having selected the first intermediate switching device as the first flooding relay belonging to the second attribute type for an identified multicast flow chosen by the second leaf network device.

20. The one or more non-transitory tangible media of claim 18, wherein:

the registration messages for the first and second flooding relays specify an identified multicast flow of data packets, the first and second attribute types defining binary attribute types for establishment of the first and second redundant multicast trees according to a link-disjoint topology and selectively according to a node-disjoint topology;

the registration messages causing the first flooding relay and the first ToF switching device to allocate the first multicast tree, for multicasting of the identified multicast flow of data packets to multicast listeners via first tree members associated with the first attribute type;

the registration messages further causing the second flooding relay and the second ToF switching device to allocate the second multicast tree for redundant multicasting of the identified multicast flow of data packets to the multicast listeners via second tree members associated with the second attribute type.

\* \* \* \* \*